US008411920B2

(12) United States Patent
Saijo et al.

(10) Patent No.: US 8,411,920 B2
(45) Date of Patent: Apr. 2, 2013

(54) DETECTING DEVICE, DETECTING METHOD, PROGRAM, AND ELECTRONIC APPARATUS

(75) Inventors: Nobuhiro Saijo, Tokyo (JP); Toshio Mamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 28 days.

(21) Appl. No.: 13/233,230

(22) Filed: Sep. 15, 2011

(65) Prior Publication Data
US 2012/0076375 A1    Mar. 29, 2012

(30) Foreign Application Priority Data

Sep. 21, 2010   (JP) ................................ 2010-211399

(51) Int. Cl.
*G06K 9/00*   (2006.01)
(52) U.S. Cl. ........................ 382/128; 382/118; 382/218
(58) Field of Classification Search .................. None
See application file for complete search history.

(56) References Cited

U.S. PATENT DOCUMENTS

| | | | | |
|---|---|---|---|---|
| 4,909,254 A * | 3/1990 | Wilkinson | ....................... | 607/94 |
| 5,031,049 A * | 7/1991 | Toyama et al. | ............... | 348/352 |
| 5,418,574 A * | 5/1995 | Miyabata et al. | ............ | 348/625 |
| 5,771,033 A * | 6/1998 | Katzenberger | ................ | 345/698 |
| 5,791,345 A * | 8/1998 | Ishihara et al. | ............... | 600/368 |
| 5,836,999 A * | 11/1998 | Eckhouse et al. | .............. | 607/88 |
| 5,987,151 A * | 11/1999 | Akashi | .......................... | 382/100 |
| 6,104,939 A * | 8/2000 | Groner et al. | ................. | 600/322 |
| 6,162,211 A * | 12/2000 | Tankovich et al. | ............... | 606/9 |
| 6,292,576 B1 * | 9/2001 | Brownlee | ....................... | 382/124 |
| 6,447,537 B1 * | 9/2002 | Hartman | .......................... | 607/94 |
| 7,023,589 B2 * | 4/2006 | Yamaguchi | .................... | 358/487 |
| 7,415,139 B2 * | 8/2008 | Takiguchi | ...................... | 382/115 |
| 7,427,981 B2 * | 9/2008 | DePue et al. | .................. | 345/166 |
| 2006/0013454 A1 * | 1/2006 | Flewelling et al. | ........... | 382/128 |
| 2007/0140553 A1 * | 6/2007 | Katsumata | ..................... | 382/162 |
| 2008/0304736 A1 * | 12/2008 | Nakagawa et al. | ........... | 382/165 |

OTHER PUBLICATIONS

Suzuki, et al. "Detection Method of Skin Region by Near-IR Spectrum Multi-Band", Trans. Inst. Electr. Engnr. Jpn. C, vol. 127, No. 4, 2007.

* cited by examiner

*Primary Examiner* — Manav Seth
(74) *Attorney, Agent, or Firm* — K&L Gates LLP

(57) ABSTRACT

A detecting device detecting a skin region of a subject. The detecting device comprising: a first irradiation section that irradiates the subject with light of a first wavelength; a second irradiation section that irradiates the subject with light of a second wavelength; a captured image creating section that creates a first image based on light reflected from the subject when the subject is irradiated with light of the first wavelength, creates a second image based on light reflected from the subject when the subject is irradiated with light of the second wavelength, and creates an external light image based on light reflected from the subject when the subject is not irradiated with any light of the first and second wavelengths; and a detecting section that detects the skin region on the basis of the first image, the second image, and the external light image.

11 Claims, 15 Drawing Sheets

LUMINANCE VALUE 200

LUMINANCE VALUE 100

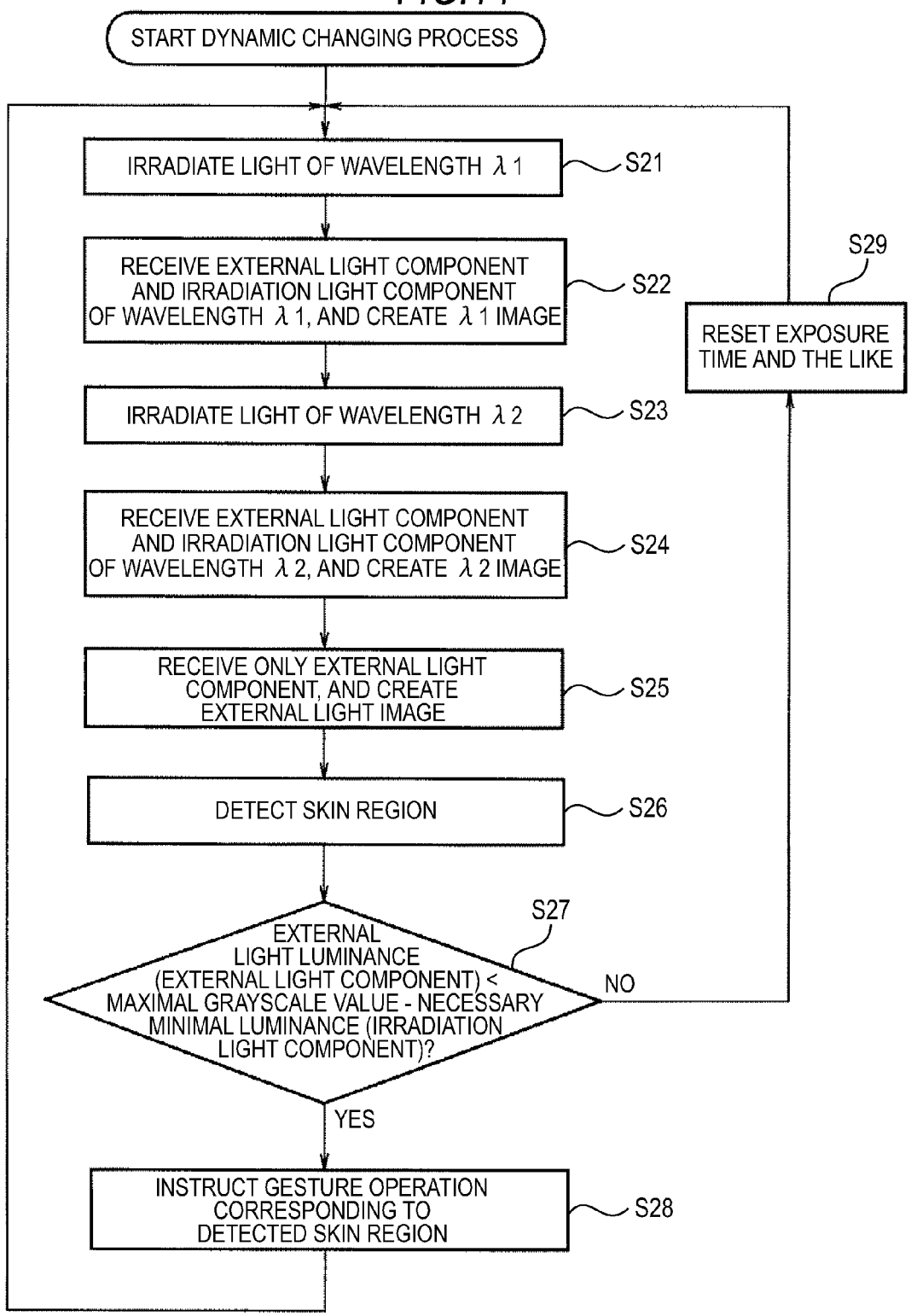

DETECTING DEVICE, DETECTING METHOD, PROGRAM, AND ELECTRONIC APPARATUS

CROSS REFERENCES TO RELATED APPLICATIONS

The present application claims priority to Japanese Priority Patent Application JP 2010-211399 filed in the Japan Patent Office on Sep. 21, 2010, the entire content of which is hereby incorporated by reference.

BACKGROUND

The present application relates to a detecting device, a detecting method, a program, and an electronic apparatus, and particularly, to a detecting device, a detecting method, a program, and an electronic apparatus appropriately used to detect, for example, a shape of a human hand on an image.

There is a skin detecting technique that detects a region (hereinafter, referred to as a skin region) where a skin such as a face or a hand is exposed on an image obtained by capturing an image of a person (for example, refer to Electric Engineering C (proposal of skin detecting method using near infrared multi-bandwidth) written by Suzuki Yasuhiro, Japan, 2007, Vol. 127, No. 4).

In this skin detecting technique, a first image capturing an image of a subject (a person) irradiated with light of a wavelength $\lambda 1$ output from an LED (a light emitting diode) and a second image capturing the image of the subject irradiated with light of a wavelength $\lambda 2$ different from the wavelength $\lambda 1$ output from an LED, are obtained. Then, a region where a difference between pixel values (luminance values or 256 grayscale luminance values of pixels) of the first and second images is larger than a predetermined threshold value is detected as a skin region.

Furthermore, the wavelengths $\lambda 1$ and $\lambda 2$ are determined according to the reflectance characteristics of human skin. That is, the reflectances of the light of the wavelengths $\lambda 1$ and $\lambda 2$ irradiated to the human skin are different from each other, and the reflectances of the light of the wavelengths $\lambda 1$ and $\lambda 2$ irradiated to a portion other than the human skin (for example, clothes and the like) are almost the same. Specifically, for example, the wavelength $\lambda 1$ is set to 870 nm, and the wavelength $\lambda 2$ is set to 950 nm.

SUMMARY

Incidentally, the subject is irradiated with light of an external light source such as the sun or a fluorescent lamp in addition to the light of the wavelengths $\lambda 1$ and $\lambda 2$ of the LEDs.

Then, for example, when the amount of the light of the external light source is comparatively larger than that of the light of the LED, for example, as in the case where the subject is irradiated with the sunlight, the pixel value causes overexposure due to the light of the external light source, and the difference between the pixel values of the first and second images corresponding to the difference between the reflectances of the light of the wavelength $\lambda 1$ and the wavelength $\lambda 2$ with respect to the subject becomes a small value (almost 0), so that the skin region may not be detected with high precision.

Therefore, in order to detect the skin region with high precision, it is preferred that the influence of the light of the external light source is reduced (removed) so that the skin region can be detected with high precision.

Thus, it is desirable to detect the skin region with high precision by reducing the influence of the light of the external light source.

An embodiment is directed to a detecting device detecting a skin region representing a skin portion of a subject, the detecting device including: a first irradiation section that allows the subject to be irradiated with light of a first wavelength; a second irradiation section that allows the subject to be irradiated with light of a second wavelength as a long wavelength in relation to the first wavelength; a captured image creating section that creates a first image on the basis of light reflected from the subject when the subject is irradiated with the light of the first wavelength, creates a second image on the basis of light reflected from the subject when the subject is irradiated with the light of the second wavelength, and creates an external light image on the basis of light reflected from the subject when the subject is not irradiated with any light of the first and second wavelengths; and a detecting section that detects the skin region on the basis of a first value representing a ratio between a difference between a pixel value of the first image and a pixel value of the external light image and a difference between a pixel value of the second image and the pixel value of the external light image or a second value obtained by normalizing the difference between the pixel value of the first image and the pixel value of the second image to at least one of a difference obtained by subtracting the pixel value of the external light image from the pixel value of the first image and the difference obtained by subtracting the pixel value of the external light image from the pixel value of the second image.

The captured image creating section may receive light reflected from the subject for an exposure time determined in advance so that the maximal value of the pixel value of the skin region on the external light image becomes less than a predetermined value.

The captured image creating section may receive light reflected from the subject for the exposure time determined in advance so that the maximal value of the pixel value of the skin region on the external light image becomes less than the predetermined value obtained by subtracting a predetermined value based on the amount of the light of the first and second wavelengths from the maximal value obtained as the pixel value.

The detecting device may further include: a determining section that determines whether the maximal value of the pixel value of the skin region detected by the detecting section as a region on the external light image created by the captured image creating section is less than the predetermined value; and a setting section that sets the exposure time of the captured image creating section to the shorter exposure time when it is determined that the maximal pixel value is not less than the predetermined value.

The first irradiation section may irradiate the light of the first wavelength with an accumulated light amount equal to or more than a minimal accumulated light amount determined in advance as an accumulated light amount minimally necessary for detecting the skin region, and the second irradiation section may irradiate the light of the second wavelength with a light amount equal to or more than the minimal accumulated light amount.

The detecting device may further include an irradiation control section that operates the first and second irradiation sections in a manner such that a rated current corresponding to the irradiation time is made to flow to the first and second irradiation sections.

The detecting device may further include: a restricting section that restricts visible light from being input to the captured image creating section, wherein the first irradiation section irradiates the light of the first wavelength as a wavelength of a near infrared light region, wherein the second irradiation section irradiates the light of the second wavelength as a wavelength of a near infrared light region, and wherein the captured image creating section receives light reflected from the subject through the restricting section.

The first irradiation section may irradiate the light of the first wavelength for the same irradiation time as the exposure time, and the second irradiation section may irradiate the light of the second wavelength for the same irradiation time as the exposure time.

Another embodiment is directed to a detecting method of a detecting device detecting a skin region representing a skin portion of a subject and including a first irradiation section that allows the subject to be irradiated with light of a first wavelength; a second irradiation section that allows the subject to be irradiated with light of a second wavelength as a long wavelength in relation to the first wavelength; and a captured image creating section that creates a first image on the basis of light reflected from the subject when the subject is irradiated with the light of the first wavelength, creates a second image on the basis of light reflected from the subject when the subject is irradiated with the light of the second wavelength, and creates an external light image on the basis of light reflected from the subject when the subject is not irradiated with any light of the first and second wavelengths, the detecting method including: detecting the skin region on the basis of a first value representing a ratio between a difference between a pixel value of the first image and a pixel value of the external light image and a difference between a pixel value of the second image and the pixel value of the external light image or a second value obtained by normalizing the difference between the pixel value of the first image and the pixel value of the second image to at least one of a difference obtained by subtracting the pixel value of the external light image from the pixel value of the first image and the difference obtained by subtracting the pixel value of the external light image from the pixel value of the second image.

Still another embodiment is directed to a program for a computer controlling a detecting device detecting a skin region representing a skin portion of a subject and including a first irradiation section that allows the subject to be irradiated with light of a first wavelength; a second irradiation section that allows the subject to be irradiated with light of a second wavelength as a long wavelength in relation to the first wavelength; and a captured image creating section that creates a first image on the basis of light reflected from the subject when the subject is irradiated with the light of the first wavelength, creates a second image on the basis of light reflected from the subject when the subject is irradiated with the light of the second wavelength, and creates an external light image on the basis of light reflected from the subject when the subject is not irradiated with any light of the first and second wavelengths. The program causes the computer to serve as a detecting section that detects the skin region on the basis of a first value representing a ratio between a difference between a pixel value of the first image and a pixel value of the external light image and a difference between a pixel value of the second image and the pixel value of the external light image or a second value obtained by normalizing the difference between the pixel value of the first image and the pixel value of the second image to at least one of a difference obtained by subtracting the pixel value of the external light image from the pixel value of the first image and the difference obtained by subtracting the pixel value of the external light image from the pixel value of the second image.

Yet another embodiment is directed to an electronic apparatus including: a detecting device detecting a skin region representing a skin portion of a subject, the detecting device including: a first irradiation section that allows the subject to be irradiated with light of a first wavelength; a second irradiation section that allows the subject to be irradiated with light of a second wavelength as a long wavelength in relation to the first wavelength; a captured image creating section that creates a first image on the basis of light reflected from the subject when the subject is irradiated with the light of the first wavelength, creates a second image on the basis of light reflected from the subject when the subject is irradiated with the light of the second wavelength, and creates an external light image on the basis of light reflected from the subject when the subject is not irradiated with any light of the first and second wavelengths; and a detecting section that detects the skin region on the basis of a first value representing a ratio between a difference between a pixel value of the first image and a pixel value of the external light image and a difference between a pixel value of the second image and the pixel value of the external light image or a second value obtained by normalizing the difference between the pixel value of the first image and the pixel value of the second image to at least one of a difference obtained by subtracting the pixel value of the external light image from the pixel value of the first image and the difference obtained by subtracting the pixel value of the external light image from the pixel value of the second image.

According to the embodiments, the first image is created on the basis of the light reflected from the subject when the subject is irradiated with the light of the first wavelength, the second image is created on the basis of the light reflected from the subject when the subject is irradiated with the light of the second wavelength, the external light image is created on the basis of the light reflected from the subject when the subject is not irradiated with any light of the first and second wavelengths, and then the skin region is detected on the basis of a first value representing a ratio between a difference between a pixel value of the first image and a pixel value of the external light image and a difference between a pixel value of the second image and the pixel value of the external light image or a second value obtained by normalizing the difference between the pixel value of the first image and the pixel value of the second image to at least one of a difference obtained by subtracting the pixel value of the external light image from the pixel value of the first image and the difference obtained by subtracting the pixel value of the external light image from the pixel value of the second image.

According to the embodiments, the skin region may be detected with high precision by reducing the influence of the external light source.

Additional features and advantages are described herein, and will be apparent from the following Detailed Description and the figures.

BRIEF DESCRIPTION OF THE FIGURES

FIG. 14 is a flowchart illustrating a dynamic changing process performed by an information processing system of a second embodiment.

DETAILED DESCRIPTION

Embodiments of the present application will be described below in detail with reference to the drawings.

1. First embodiment (an example in which a skin is detected after an external light component generated from an external light source is removed)
2. Second embodiment (an example in which an external light component is reduced by adjusting an exposure time and the like of a camera)
3. Modified example 1. First Embodiment Configuration Example of Information Processing System 41

Figure 1:
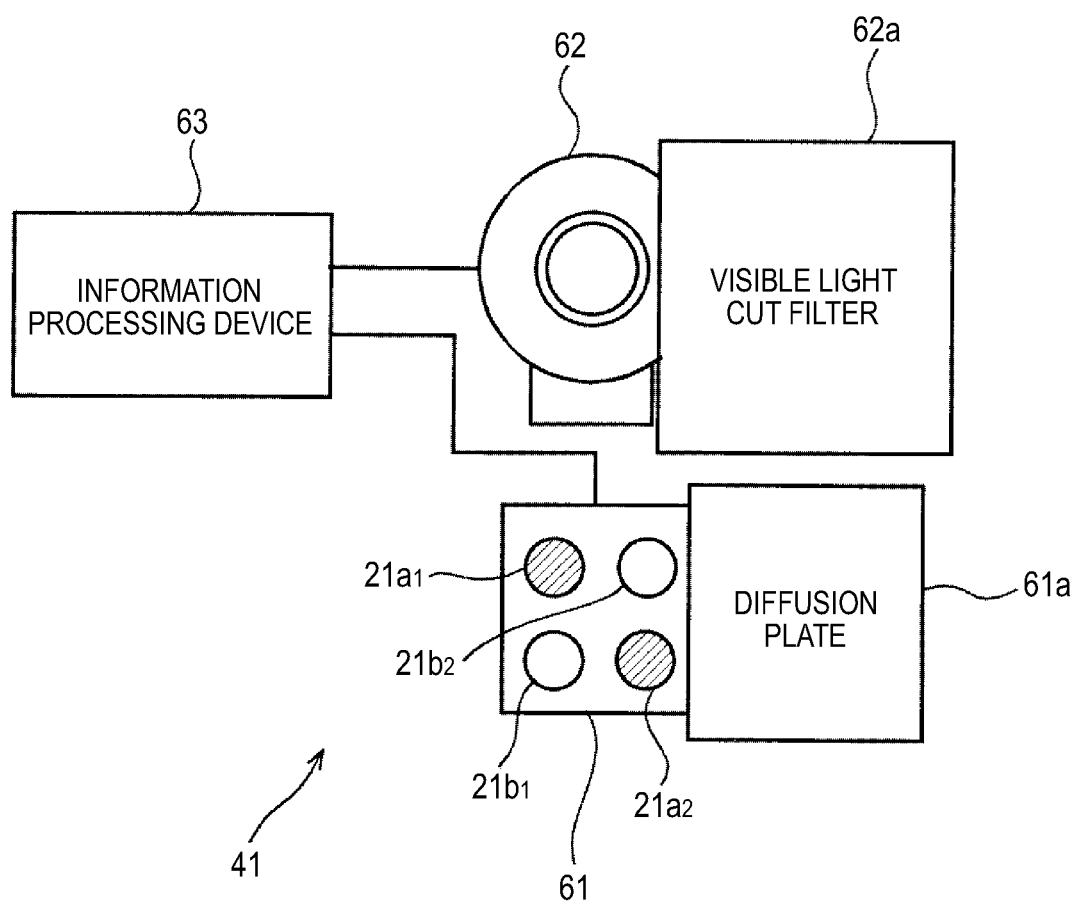
FIG. 1 is a block diagram illustrating a configuration example of an information processing system according to an embodiment.

FIG. 1 illustrates a configuration example of an information processing system 41 according to an embodiment.

The information processing system 41 includes a light emitting device 61, a camera 62, and an information processing device 63.

Furthermore, the information processing system 41 is configured to detect a skin region with high precision regardless of light from an external light source by reducing an influence of the light from the external light source.

The light emitting device 61 includes an LED 21a (an LED 21a1 and an LED 21a2) and an LED 21b (an LED 21b1 and an LED 21b2), and alternately emits light from the LED 21a and the LED 21b.

The LED 21a allows a subject to be irradiated with light of a wavelength λ1 (for example, the light of the wavelength λ1 in the near infrared light region), and the LED 21b allows the subject to be irradiated with light of a wavelength λ2 (for example, the light of the wavelength λ2 in the near infrared light region) which is a long wavelength compared to the wavelength λ1. Furthermore, the number of LEDs constituting the LED 21a and the LED 21b is not limited to two, and may be appropriately determined so that the subject is irradiated without irregularity in light amount necessary for the light. Further, this will be more specifically described by referring to FIG. 2, but the skin detection may be performed when the value of the wavelength λ1 is selected from the range of 640 nm to 1000 nm and the value of the wavelength λ2 near the long wavelength in relation to the wavelength λ1 is selected from the range of 900 nm to 1100 nm. However, in order to prevent a subject as an operator of the information processing system 41 from being dazzled by the light of the LED, it is more desirable that the range of the wavelength λ1 be set in the range of 700 nm to 1000 nm of the near infrared light region excluding the visible light region.

Further, the outputs of the LED 21a and the LED 21b are adjusted in advance so that pixel values (for example, luminance values or 256 grayscale luminance values of pixels) are equal to each other between corresponding pixels of an image captured by the camera 62 even when subjects having the same reflectance with respect to the wavelengths λ1 and λ2 are irradiated with any light of the wavelength λ1 or λ2.

Further, it is desirable that the front surfaces of the LEDs 21a and 21b be provided with diffusion plates 61a that uniformly diffuse the light emitted from the LEDs 21a and 21b. Accordingly, the subject is irradiated with the light of the wavelength λ1, and the light of the wavelength λ2 without irregularity.

The camera 62 includes a lens used to capture a subject such as a user, and the front surface of the lens is covered with, for example, a visible light cut filter 62a that cuts off visible light with a wavelength shorter than that of the wavelength λ1.

For this reason, the visible light does not input to the camera 62, but only the invisible light such as the light of the wavelengths λ1 and λ2 inputs thereto. Furthermore, in a general camera, the light receiving sensitivity with respect to the visible light is set to be higher than that of the invisible light. Therefore, the front surface of the lens of the camera 62 is provided with the visible light cut filter 62a so as to suppress overexposure caused by the visible light from the external light source. Further, since the visible light cut filter 62a is provided to reduce the influence of the external light source, for example, the output of the light from the LED 21a and the LED 21b may be set to be small compared to the case where the visible light cut filter 62a is not provided.

When the LED 21a emits light, the camera 62 receives the irradiation light component of the wavelength λ1 and the external light component to create a λ1 image, and supplies the image to the information processing device 63.

Furthermore, the irradiation light component of the wavelength λ1 indicates the reflected light of the light of the wavelength λ1 to be irradiated from the LED 21a to the subject. Further, the external light component indicates the reflected light of the light to be irradiated from the external light source to the subject and the light directly input from the external light source. Each pixel value constituting the λ1 image is expressed by the sum $(I_{\lambda 1}+I_{off})$ of a pixel value $I_{\lambda 1}$ only corresponding to the irradiation light component of the wavelength λ1 and a pixel value $I_{off}$ only corresponding to the external light component.

Further, for example, when the LED 21b emits light, the camera 62 receives the irradiation light component of the wavelength λ2 and the external light component to create a λ2 image, and supplies the image to the information processing device 63.

Furthermore, the irradiation light component of the wavelength λ2 indicates the reflected light of the light of the wavelength λ2 to be irradiated from the LED 21b to the subject. Each pixel value constituting the λ2 image is expressed by the sum ($I_{\lambda 2}+I_{off}$) of a pixel value $I_{\lambda 2}$ only corresponding to the irradiation light component of the wavelength λ2 and the pixel value $I_{off}$ only corresponding to the external light component.

Furthermore, for example, when the LED 21a and the LED 21b are all turned off, the camera 62 receives only the external light component to create an external light image, and supplies the image to the information processing device 63. Each pixel value constituting the external light image is expressed by the pixel value $I_{off}$ only corresponding to the external light component.

The information processing device 63 removes the pixel value $I_{off}$ corresponding to the external light component from each of the λ1 image and the λ2 image on the basis of the external light image created by the camera 62. Then, the information processing device 63 detects a skin region on the basis of a ratio $I_{\lambda 1}/I_{\lambda 2}$ between the pixel value $I_{\lambda 1}$ of the λ1 image obtained by removing the pixel value $I_{off}$ therefrom and the pixel value $I_{\lambda 2}$ of the λ2 image obtained by removing the pixel value $I_{off}$ therefrom.

Figure 2:
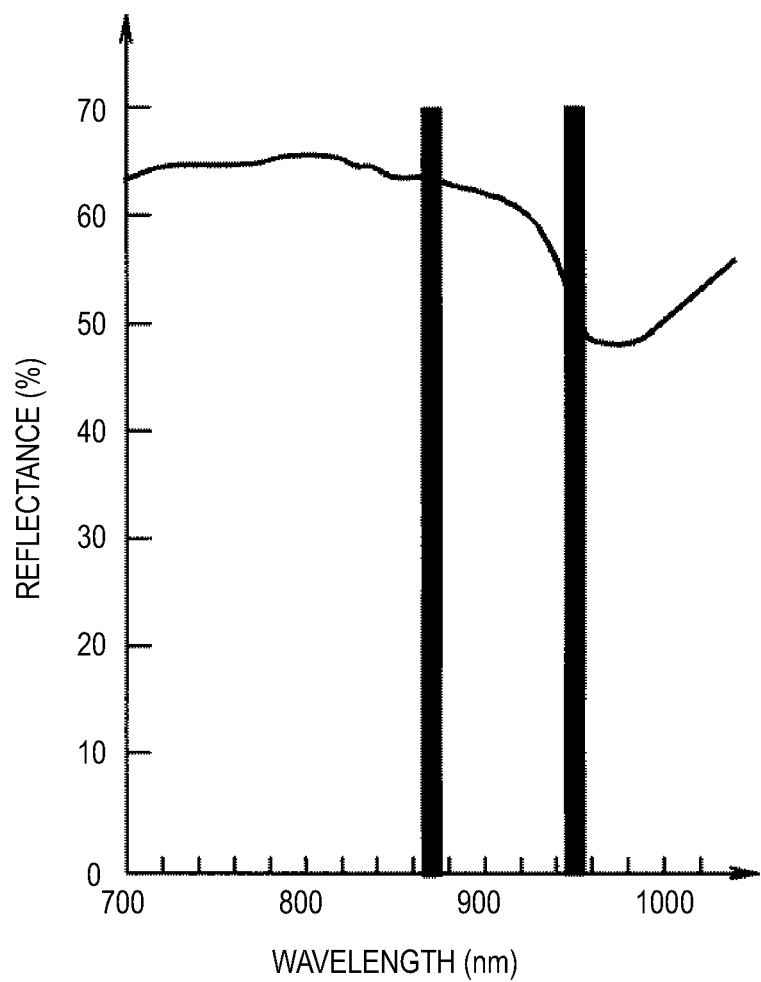
FIG. 2 is a diagram illustrating an example of spectral reflectance characteristics with respect to human skin.

Next, referring to FIG. 2, the wavelength λ1 of the light irradiated from the LED 21a and the wavelength λ2 of the light irradiated from the LED 21b will be described. FIG. 2 illustrates reflectance characteristics supposed on a human skin region.

As shown in FIG. 2, generally, the human skin region has a minimal value near the wavelength of 960 nm.

The skin detection may be performed when the value of the wavelength λ1 is set from 640 nm to 1000 nm and the value of the wavelength λ2 near the long wavelength in relation to the wavelength λ1 is set from 900 nm to 1100 nm from the viewpoint that the reflectances of the wavelength λ1 and the wavelength λ2 are different from each other to a certain degree in the skin region and a region other than the skin region. However, for example, the reflectance of the hair increases as the wavelength increases. For this reason, in order to more accurately distinguish the skin and the hair from each other, the value of the wavelength λ1 may be set to 900 nm or less and the value of the wavelength λ2 near the long wavelength in relation to the wavelength λ1 may be set to 930 nm or more so that the ratio obtained by dividing the reflectance of the wavelength λ1 by the reflectance of the wavelength λ2 becomes larger than that other than the skin region.

Furthermore, in the description below, it is assumed that λ1=870 nm and λ2=950 nm. In this case, as shown in FIG. 2, the reflectance of the wavelength λ1 becomes approximately 63%, and the reflectance of the wavelength λ2 becomes approximately 50%. Therefore, the ratio Iλ1/Iλ2 of the skin region is approximately 1.26 (=63/50) to correspond to the ratio between the reflectances of the wavelengths λ1 and λ2.

Further, at this time, for example, when the visible light cut filter 62a is selected which cuts off the visible light of the wavelength of 800 nm or less and a part of the near infrared light near the low wavelength, the influence of the external light source may be further reduced without affecting the received light of the light irradiated from the LEDs 21a and 21b of the wavelengths λ1 and λ2.

On the contrary, in a region other than the skin region (a general non-skin region such as clothes), the reflectance hardly changes in any one of the wavelengths λ1 and λ2. Therefore, the ratio $I_{\lambda 1}/I_{\lambda 2}$ in the non-skin region becomes approximately 1. Further, in a region other than a specific skin region such as a hair, the ratio $I_{\lambda 1}/I_{\lambda 2}$ becomes 1 or less (typically, 0.8 or less).

For this reason, the information processing device 63 may detect the skin region on the basis of, for example, whether the ratio $I_{\lambda 2}/I_{\lambda 1}$ is a predetermined threshold value (for example, 1.1) or more.

Outline of Process Performed by Information Processing Device 63

Figure 3:
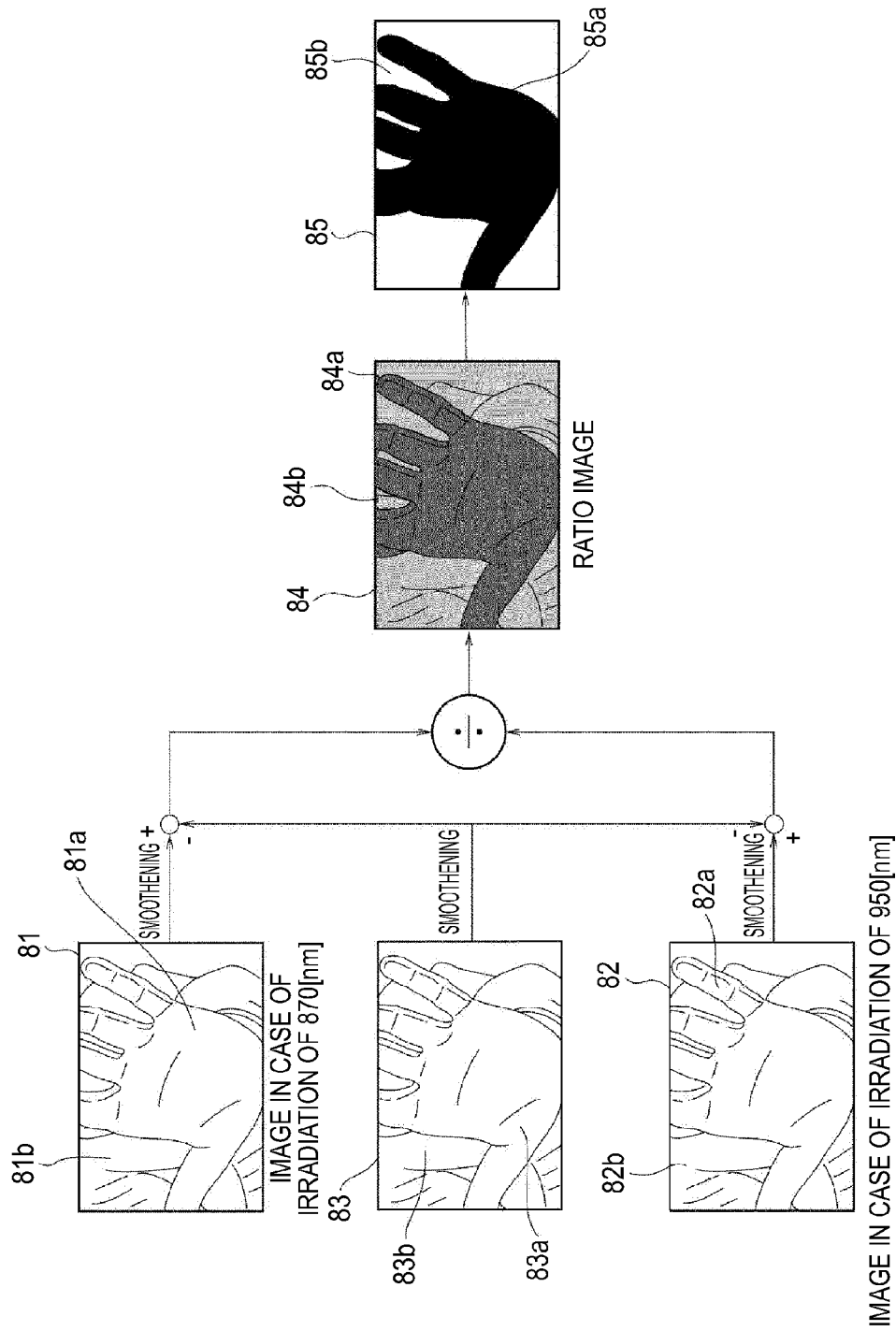
FIG. 3 is a diagram illustrating an example of an outline of a process performed by the information processing device of a first embodiment.

Next, FIG. 3 illustrates an outline of a process in which the information processing device 63 detects the skin region on the basis of the magnitude of the ratio $I_{\lambda 2}/I_{\lambda 1}$.

The information processing device 63 controls the camera 62 and the like so that the camera 62 captures the λ1 image, and supplies the image to the information processing device 63.

Further, the information processing device 63 controls the camera 62 and the like so that the camera 62 captures the λ2 image, and supplies the image to the information processing device 63.

Furthermore, the information processing device 63 controls the camera 62 and the like so that the camera 62 captures the external light image, and supplies the image to the information processing device 63.

The information processing device 63 receives images from the camera 62, where the images correspond to the λ1 image 81 formed by the skin region 81a and the non-skin region 81b (the region other than the skin region 81a), the λ2 image 82 formed by the skin region 82a and the non-skin region 82b (the region other than the skin region 82a), and the external light image 83 formed by the skin region 83a and the non-skin region 83b (the region other than the skin region 83a).

The information processing device 63 smoothens the λ1 image 81, the λ2 image 82, and the external light image 83 supplied from the camera 62 by using an LPF (a low pass filter). The information processing device 63 calculates the pixel value $I_{\lambda 1}$ $(=(I_{\lambda 1}+I_{off})-I_{off})$ only corresponding to the irradiation light component of the wavelength λ1 on the basis of the pixel value $(I_{\lambda 1}+I_{off})$ of the smoothened λ1 image 81 and the pixel value $I_{off}$ of the smoothened external light image 83. Further, the information processing device 63 calculates the corresponding pixel value $I_{\lambda 2}$ $(=(I_{\lambda 2}+I_{off})-I_{off})$ only corresponding to the irradiation light component of the wavelength λ2 on the basis of the pixel value $(I_{\lambda 2}+I_{off})$ of the smoothened λ2 image 82 and the pixel value $I_{off}$ of the smoothened external light image 83.

Then, the information processing device 63 creates a ratio image 84 in which the ratio $I_{\lambda 1}/I_{\lambda 2}$ of the calculated pixel values $I_{\lambda 1}$ and $I_{\lambda 2}$ is set to a pixel value. Furthermore, in the ratio image 84, the pixel value of each pixel constituting the skin region 84a becomes the ratio $I_{\lambda 1}/I_{\lambda 2}$ corresponding to each pixel value of the skin region 81a or 83a, and each pixel constituting the non-skin region 84b becomes the ratio $I_{\lambda 1}/I_{\lambda 2}$ corresponding to each pixel value of the non-skin region 81b or 83b.

Further, the smoothening timing is not limited thereto, and the smoothening process may be performed even after the pixel value $I_{\lambda 1}$ and the pixel value $I_{\lambda 2}$ are calculated (for example, the smoothening process is performed on the ratio image 84) and may be performed at a plurality of positions.

The information processing device 63 performs a binarization process on the created ratio image 84 so that a pixel value equal to or more than a predetermined threshold value (for example, 1.1) of the pixel values constituting the ratio image 84 is set to 1 and a pixel value less than the threshold value is set to 0.

Then, the information processing device 63 detects the skin region 85a, constituted by the pixel having a pixel value equal to 1 in the pixels constituting the binarization image 85 obtained by the binarization process, as the skin region. Furthermore, the non-skin region 85*b* of the binarization image 85 is constituted by the pixel having a pixel value equal to 0.

Incidentally, the skin region may be detected by seeing the difference between the λ1 image and the λ2 image; however, in this method, accurate detection may not be performed when the external light component is considerably larger than the irradiation light component.

The reason is as follows. When the difference is taken between the pixel value ($I_{\lambda 1}+I_{off}$) of the λ1 image 81 and the pixel value ($I_{\lambda 2}+I_{off}$) of the λ2 image 82, ($I_{\lambda 1}+I_{off}$)−($I_{\lambda 2}+I_{off}$)= $I_{\lambda 1}-I_{\lambda 2}$) is obtained. However, even when the difference ($I_{\lambda 1}-I_{\lambda 2}$) of the irradiation light components of the LED 21*a* and the LED 21*b* is given, the absolute value of the irradiation component is not given.

For example, even when the pixel values ($I_{\lambda 1}+I_{off}$) are the same value, since the pixel value $I_{\lambda 1}$ changes in accordance with the magnitude of the pixel value $I_{off}$ corresponding to the external light component, the pixel value $I_{\lambda 2}$ of the skin region also changes, whereby the skin region may not be accurately detected from the difference ($I_{\lambda 1}-I_{\lambda 2}$).

That is, for example, when the pixel value $I_{off}$ corresponding to the external light component is large, the pixel value $I_{\lambda 1}$ becomes a relatively small value in the pixel value ($I_{\lambda 1}+I_{off}$) of the λ1 image 81, and the pixel value $I_{\lambda 2}$ also becomes a relatively small value in the pixel value ($I_{\lambda 2}+I_{off}$) of the λ2 image 82.

In this case, for example, the difference ($I_{\lambda 1}-I_{\lambda 2}$) of the skin region becomes a relatively small value (for example, when $I_{\lambda 1}$ is a large value such as 100 and $I_{\lambda 2}$ is a large value such as 80, the difference becomes a comparatively large value such as 20, but when $I_{\lambda 1}$ is a small value such as 10 and $I_{\lambda 2}$ is a small value such as 8, the difference becomes a comparatively small value such as 2), so that the difference of the skin region and the difference (the comparatively small difference) of the non-skin region may not be distinguished from each other by using the threshold value as a fixed value. As a result, the skin region may not be accurately detected on the basis of the comparison result between the threshold value as the fixed value and the difference ($I_{\lambda 1}-I_{\lambda 2}$).

Further, when the external light source is a solar ray, the pixel value $I_{off}$ is not dependent on a distance z from the light emitting device 61, but the pixel values $I_{\lambda 1}$ and $I_{\lambda 2}$ of the irradiation light component become smaller as the distance z from the light emitting device 61 becomes farther. Therefore, for this reason, the skin region may not be accurately detected on the basis of the comparison result obtained by comparing the difference of the irradiation light component and the threshold value as the fixed value.

Regarding this, the information processing device 63 may use a fixed value (for example, 1.1) as the threshold value used to perform the binarization process regardless of the magnitude of the external light component or the distance z from the light emitting device 61 to the subject. Therefore, for example, the skin region may be more accurately detected with a simpler process compared to the case where the distance z is calculated when detecting the skin and the threshold value is changed in accordance with the calculated distance z.

The reason is as follows. When the pixel values $I_{\lambda 1}$ and $I_{\lambda 2}$ are obtained by removing the influence of the pixel value $I_{off}$ corresponding to the external light component from each of the pixel value ($I_{\lambda 1}+I_{off}$) of the λ1 image and the pixel value ($I_{\lambda 2}+I_{off}$) of the λ2 image, the magnitudes of the pixel values $I_{\lambda 1}$ and $I_{\lambda 2}$ expressed by the luminance value or the 256 grayscale luminance value in the skin region change in proportional to the distance z from the light emitting device 61 to the subject or the external light component. However, the ratio $I_{\lambda 1}/I_{\lambda 2}$ becomes the same value in most cases regardless of the change of the distance z or the external light component.

That is, for example, even when the combination ($I_{\lambda 1}$ and $I_{\lambda 2}$) of the pixel values changes into (25 and 20), (50 and 40), (100 and 80), or (200 and 160) in proportional to the change of the distance z or the external light component, the ratio $I_{\lambda 1}/I_{\lambda 2}$ becomes 5/4 in any case.

Therefore, the threshold value as the fixed value may be used regardless of the distance z or the external light component by using the ratio $I_{\lambda 1}/I_{\lambda 2}$ when detecting the skin region.

Furthermore, here, the difference ($I_{\lambda 1}-I_{\lambda 2}$) may be obtained from the pixel values $I_{\lambda 1}$ and $I_{\lambda 2}$ obtained by removing the influence of the pixel value $I_{off}$ corresponding to the external light component from each of the pixel value ($I_{\lambda 1}+I_{off}$) of the λ1 image and the pixel value ($I_{\lambda 2}+I_{off}$) of the λ2 image, and the skin region may be detected on the basis of the threshold value changing in accordance with the magnitude of the pixel value $I_{\lambda 1}$ or the pixel value $I_{\lambda 2}$.

That is, for example, when the pixel value $I_{\lambda 1}$ is large, the threshold value detecting the skin region on the basis of the difference ($I_{\lambda 1}-I_{\lambda 2}$) may be set to a large value, and when the pixel value $I_{\lambda 1}$ is small, the threshold value may be set to a small value. This method is also substantially the same as the method of detecting the skin region on the basis of the ratio $I_{\lambda 1}/I_{\lambda 2}$ between the pixel value $I_{\lambda 1}$ and the pixel value $I_{\lambda 2}$.

Configuration Example of Information Processing Device 63

Figure 4:
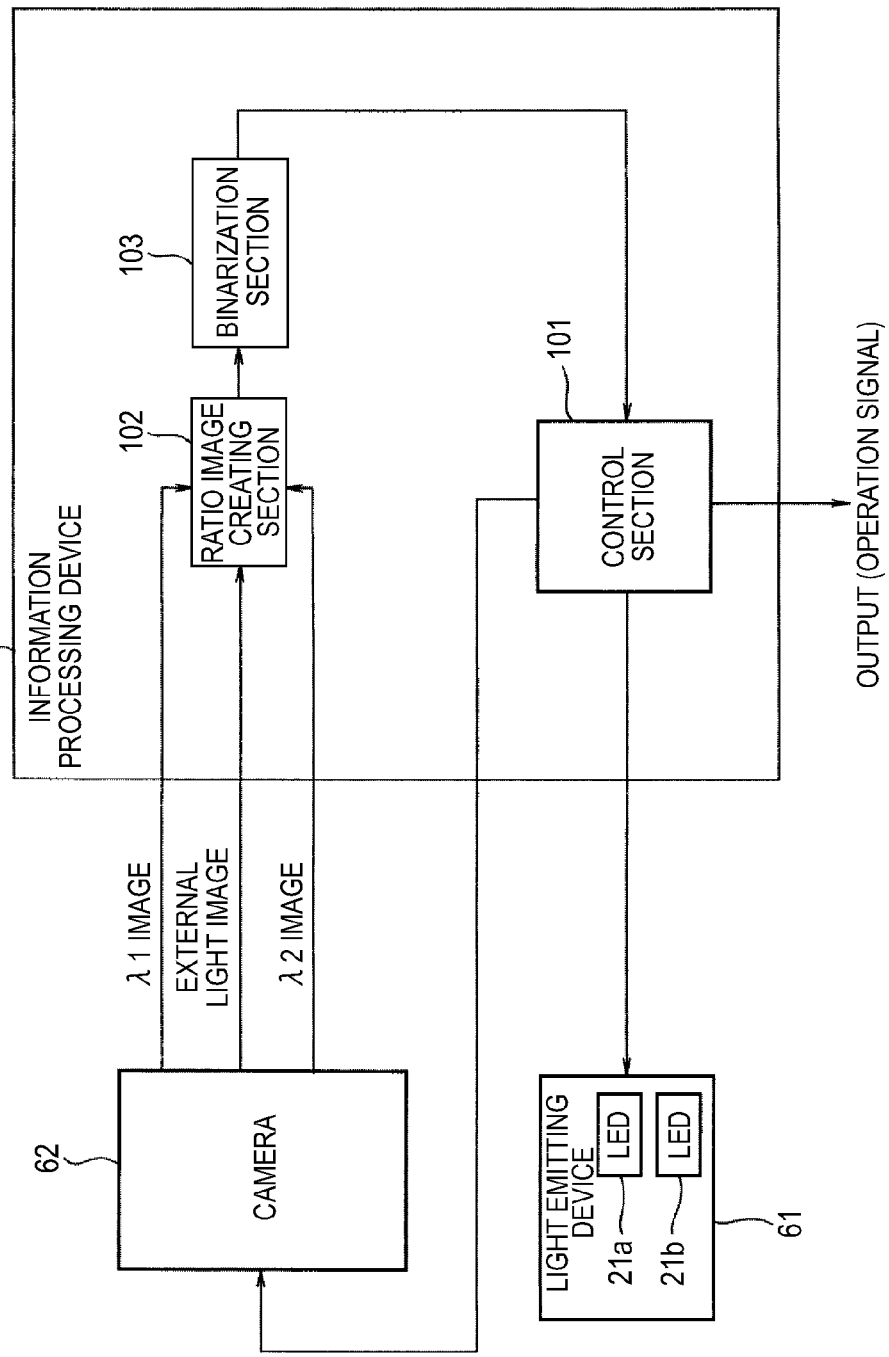
FIG. 4 is a block diagram illustrating a configuration example of the information processing device of the first embodiment.

Next, FIG. 4 illustrates a configuration example of the information processing device 63.

The information processing device 63 includes a control section 101, a ratio image creating section 102, and a binarization section 103.

The control section 101 controls the light emitting device 61 and the camera 62 so that the camera 62 captures the image of the subject while only the LED 21*a* emits light, and supplies the λ1 image obtained as a result thereof to the ratio image creating section 102.

Further, for example, the control section 101 controls the light emitting device 61 and the camera 62 so that the camera 62 captures the image of the subject while only the LED 21*b* emits light, and supplies the λ2 image obtained as a result thereof to the ratio image creating section 102.

Furthermore, for example, the control section 101 controls the light emitting device 61 and the camera 62 so that the camera 62 captures the image of the subject while the LED 21*a* and the LED 21*b* are all turned off, and supplies the external light image obtained as a result thereof to the ratio image creating section 102.

Further, for example, the control section 101 performs a corresponding process in accordance with the detection result of the skin region from the binarization section 103. Specifically, for example, when the control section 101 recognizes a gesture operation for changing a volume of an audio output device (not shown) on the basis of the detected skin region, the control section changes the volume by outputting an operation signal for changing the volume of the audio output device (not shown) to the audio output device.

The ratio image creating section 102 performs a smoothening process on the λ1 image, the λ2 image, and the external light image supplied from the camera 62 by using the LPF. Further, the ratio image creating section 102 calculates the pixel value $I_{\lambda 1}$ of which the influence of the external light component is removed by subtracting the pixel value $I_{off}$ of the external light image from the pixel value ($I_{\lambda 1}+I_{off}$) of the smoothened λ1 image. Furthermore, the ratio image creating section 102 calculates the pixel value $I_{\lambda 2}$ of which the influence of the external light component is removed by subtracting the pixel value $I_{off}$ of the external light image from the pixel value $(I_{\lambda 1}+I_{off})$ of the smoothened λ2 image.

Then, the ratio image creating section 102 calculates the ratio $I_{\lambda 1}/I_{\lambda 2}$ between the pixel values $I_{\lambda 1}$ and $I_{\lambda 2}$, and supplies the ratio image constituted by the pixel using the ratio $I_{\lambda 1}/I_{\lambda 2}$ as the pixel value to the binarization section 103.

The binarization section 103 performs a binarization process on the ratio image obtained from the ratio image creating section 102, attempts to detect the skin region on the basis of the binarization image obtained as a result thereof, and outputs the detection result to the control section 101.

Description of Operation

Next, referring to the flowchart of FIG. 5, the skin detecting process performed by the information processing system 41 will be described.

For example, the skin detecting process is started when the information processing system 41 is turned on.

In step S1, the LED 21a allows the subject to be irradiated with the light of the wavelength λ1 in accordance with the control from the control section 101. In this case, the subject is irradiated with the light of the wavelength λ1 and the light of the external light source.

In step S2, the camera 62 creates the λ1 image by receiving the light reflected from the subject irradiated with the light of the wavelength λ1 and the light of the external light source in accordance with the control of the control section 101, and supplies the image to the ratio image creating section 102. Subsequently, the LED 21a is turned off in accordance with the control of the control section 101.

In step S3, the LED 21b allows the subject to be irradiated with the light of the wavelength λ2 in accordance with the control of the control section 101. In this case, the subject is irradiated with the light of the wavelength λ2 and the light of the external light source.

In step S4, the camera 62 creates the λ2 image by receiving the light reflected from the subject irradiated with the light of the wavelength λ2 and the light of the external light source in accordance with the control of the control section 101, and supplies the image to the ratio image creating section 102. Subsequently, the LED 21b is turned off in accordance with the control of the control section 101.

In step S5, the camera 62 creates the external light image by receiving the light reflected from the subject irradiated with only the light of the external light source while the LED 21a and the LED 21b are all turned off in accordance with the control of the control section 101, and supplies the image to the ratio image creating section 102.

In step S6, the ratio image creating section 102 and the binarization section 103 detect the skin region. That is, for example, the ratio image creating section 102 performs the smoothening process on the λ1 image, the λ2 image, and the external light image supplied from the camera 62 by using the LPF. Further, the ratio image creating section 102 calculates the pixel value $I_{\lambda 1}$ of which the influence of the external light component is removed by subtracting the pixel value $I_{off}$ of the external light image from the pixel value $(I_{\lambda 1}+I_{off})$ of the smoothened λ1 image. Furthermore, the ratio image creating section 102 calculates the pixel value $I_{\lambda 2}$ of which the influence of the external light component is removed by subtracting the pixel value $I_{off}$ of the external light image from the pixel value $(I_{\lambda 1}+I_{off})$ of the smoothened λ2 image.

Then, the ratio image creating section 102 calculates the ratio $I_{\lambda 1}/I_{\lambda 2}$ between the pixel values $I_{\lambda 1}$ and $I_{\lambda 2}$, and supplies the ratio image constituted by the pixel using the ratio $I_{\lambda 1}/I_{\lambda 2}$ as the pixel value to the binarization section 103.

The binarization section 103 performs the binarization process on the ratio image obtained from the ratio image creating section 102, attempts to detect the skin region on the basis of the binarization image obtained as a result thereof, and outputs the detection result to the control section 101.

In step S7, the control section 101 performs a process corresponding to the detection result from the binarization section 103. For example, an operation signal instructing a gesture operation corresponding to the detected skin region is output, the process is returned to step S1, and then the same process is repeated. Furthermore, the skin detecting process is ended, for example, when the information processing system 41 is turned off.

As described above, according to step S6 of the skin detecting process, the skin region is detected on the basis of the pixel values $I_{\lambda 1}$ and $I_{\lambda 2}$ obtained by removing the pixel value $I_{off}$ corresponding to the external light component from each of the pixel value $(I_{\lambda 1}+I_{off})$ of the λ1 image and the pixel value $(I_{\lambda 2}+I_{off})$ of the λ2 image.

For this reason, according to the skin detecting process, it is possible to prevent an accident that the skin region may not be detected with high precision in accordance with the light of the external light source (the external light component).

Further, for example, according to the skin detecting process, the ratio $I_{\lambda 1}/I_{\lambda 2}$, which is the same value in most cases regardless of the distance z or the external light component, is used when detecting the skin region. For this reason, since the threshold value used for comparison when determining the magnitude of the ratio $I_{\lambda 1}/I_{\lambda 2}$ may be set to a fixed value regardless of the distance z or the external light component, the skin region may be more accurately detected with a simpler process compared to the method of detecting the skin region on the basis of the difference between the pixel value of the λ1 image and the pixel value of the λ2 image.

In the first embodiment, the influence of the external light source is removed when detecting the skin region by removing the pixel value $I_{off}$ included in each of the pixel value $(I_{\lambda 1}+I_{off})$ of the λ1 image and the pixel value $(I_{2}+I_{off})$ of the λ2 image. However, for example, the influence of the external light source may be reduced by suppressing the external light component while maintaining the irradiation light component of the wavelength λ1 and the irradiation light component of the wavelength λ2 as the components to be input to the camera 62.

2. Second Embodiment

Another Configuration Example of Information Processing Device 63

Figure 6:
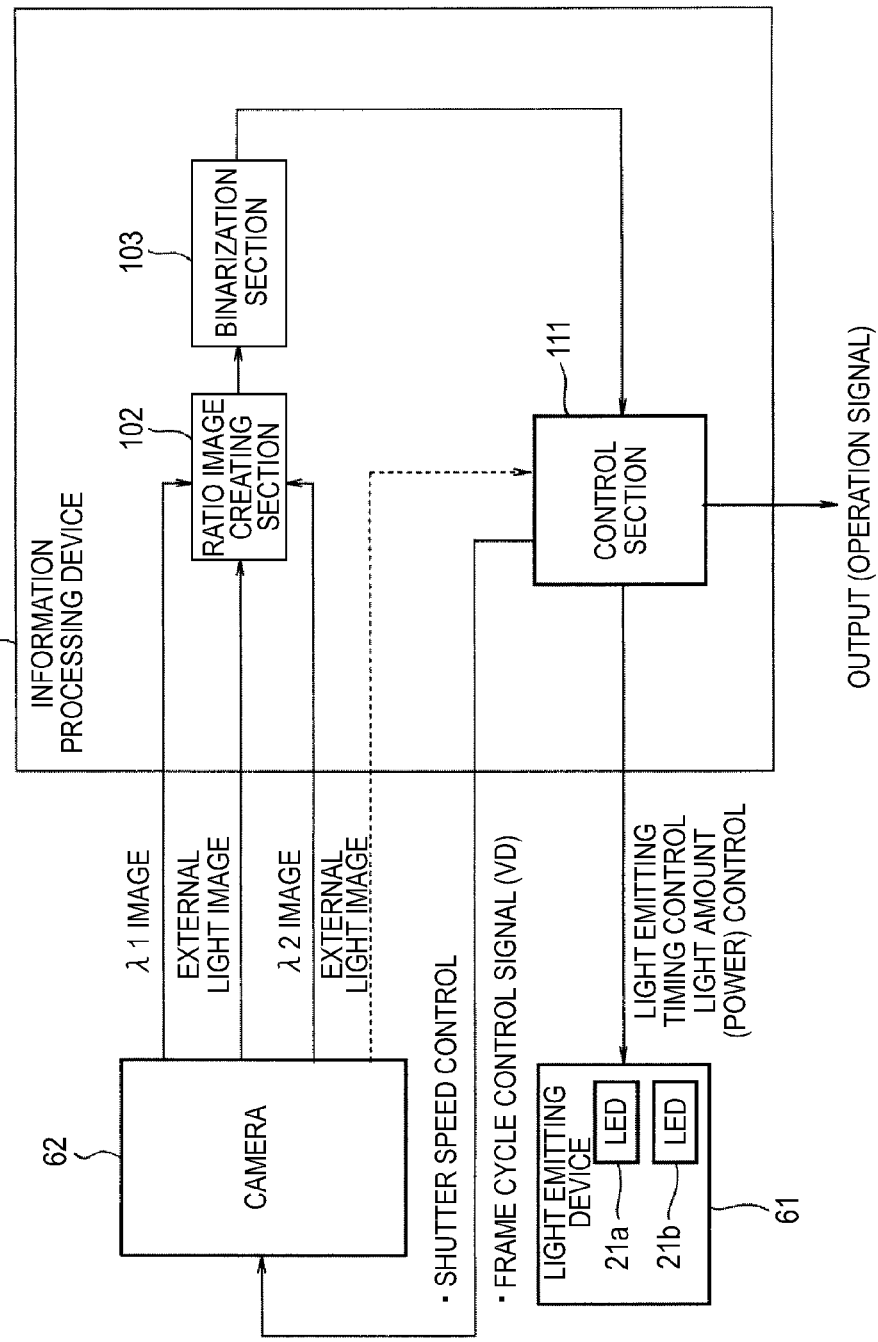
FIG. 6 is a block diagram illustrating a configuration example of an information processing device of a second embodiment.

Next, FIG. 6 illustrates a configuration example of the information processing device 63 that reduces the influence of the external light source by suppressing the external light component while the irradiation light component of the wavelength λ1 and the irradiation light component of the wavelength λ2 are maintained.

When the information processing device 63 is set to be used even when the external light component is larger than a certain degree, it is necessary to change the aperture, the sensitivity, the exposure time (the shutter speed), or the like of the camera 62 to decrease the luminance of the external light component in order to prevent overexposure occurring when the luminance value of the camera 62 exceeds the maximal allowable value due to the external light component. However, the luminance values of the irradiation light components of the LED 21a and the LED 21b become smaller.

Since the irradiation components of the LED 21a and the LED 21b are different from the external light component of the sunlight, the irradiation components becomes smaller when the distance from the light emitting device 61 becomes larger. Accordingly, when the distance from the light emitting device 61 becomes farther than a certain degree, the irradiation light components of the LED 21*a* and the LED 21*b* are buried by the noise component of the camera 62, so that it may not be detected.

In order to prevent this problem, it is necessary to increase the irradiation light amounts of the LED 21*a* and the LED 21*b*. However, when the number of the LEDs 21*a* and the LEDs 21*b* increases, a problem involving with the size or the cost of the device arises. Further, when the current of the LED 21*a* and the LED 21*b* is set to a large value, a problem arises in that power consumption increases. In addition, it is difficult to increase the current due to the restriction of the rated currents of the LED 21*a* and the LED 21*b*.

Likewise, when the influence of the external light is large, the distance range where the skin region is detected by the information processing device 63 becomes smaller. However, in the description below, the information processing device 63 capable of preventing the distance range detecting the skin by suppressing the influence of the external light will be described.

Furthermore, since the information processing device 63 of FIG. 6 is the same as the information processing device 63 of FIG. 4 except that a control section 111 is provided instead of the control section 101, the description of the ratio image creating section 102 and the binarization section 103 will be appropriately omitted below.

The control section 111 performs the same process as that of the control section 101. In addition, for example, the control section 111 determines parameters such as an exposure time of the camera 62, an irradiation time of the LED 21*a* and the LED 21*b*, and an accumulated light amount (a total light amount) of the light irradiated by the LED 21*a* and the LED 21*b* for the irradiation time in the skin detecting process before the skin detecting process is performed.

In the determination of the above-described parameters, first, the maximal allowable value of the external light (the light of the external light source) of the information processing device 63 is determined, and a hand is irradiated with the external light corresponding to the maximal allowable value, for example, while a human hand or the like is actually covered by the front surface of the camera 62. The parameters including the following procedures are determined as the specification of the information processing device 63, and is stored on the control section 111 (a memory (not shown) provided therein) of the information processing device 63. However, the parameters may be determined for each device when the information processing device 63 is manufactured, and may be stored on the control section 111.

Further, for example, when the user wants to use the information processing device 63 under the strong external light, the control section 111 may instruct the user to cover the front surface of the camera 62 by the hand or the like through a monitor or a speaker (not shown) in order to obtain the external light image only having the skin region obtained by capturing the image using the camera 62 when the information processing device 63 is not normally operated at the first setting.

Then, the control section 111 controls the camera 62 so that the image of the subject is captured, creates the external light image where the human hand (the skin region) is certainly displayed at a predetermined range, and supplies the image to the control section 111.

The control section 111 determines the exposure time of the camera 62 on the basis of the external light image from the camera 62. Furthermore, the method of determining the exposure time performed by the control section 111 will be described by referring to FIGS. 13A and 13B.

Further, the control section 111 determines the accumulated light amount at each irradiation time of the LED 21*a* and the LED 21*b* on the basis of the determined exposure time.

Then, the control section 111 controls the LED 21*a*, the LED 21*b*, and the camera 62 so that the skin detecting process is performed on the basis of the determined exposure time of the camera 62 and the accumulated light amount at each irradiation time of the LED 21*a* and the LED 21*b*.

Next, FIGS. 7A to 7G illustrate an example of a case where the control section 111 controls the light emitting device 61 and the camera 62 when the skin detecting process is performed.

The control section 111 generates a VD signal generating rising edges at timings t1, t2, t3, t4, t5, t6, . . . at the interval of 16.7 ms (=1/60 s) as a VD signal (a vertical synchronization signal) generating rising edges in accordance with the duration during which the image for one frame is captured. Then, the control section 111 performs the exposure of the camera 62 at the predetermined exposure time, and controls the LED 21*a* and the LED 21*b* so that they irradiate light (emit light) at the predetermined irradiation time.

Figure 7:
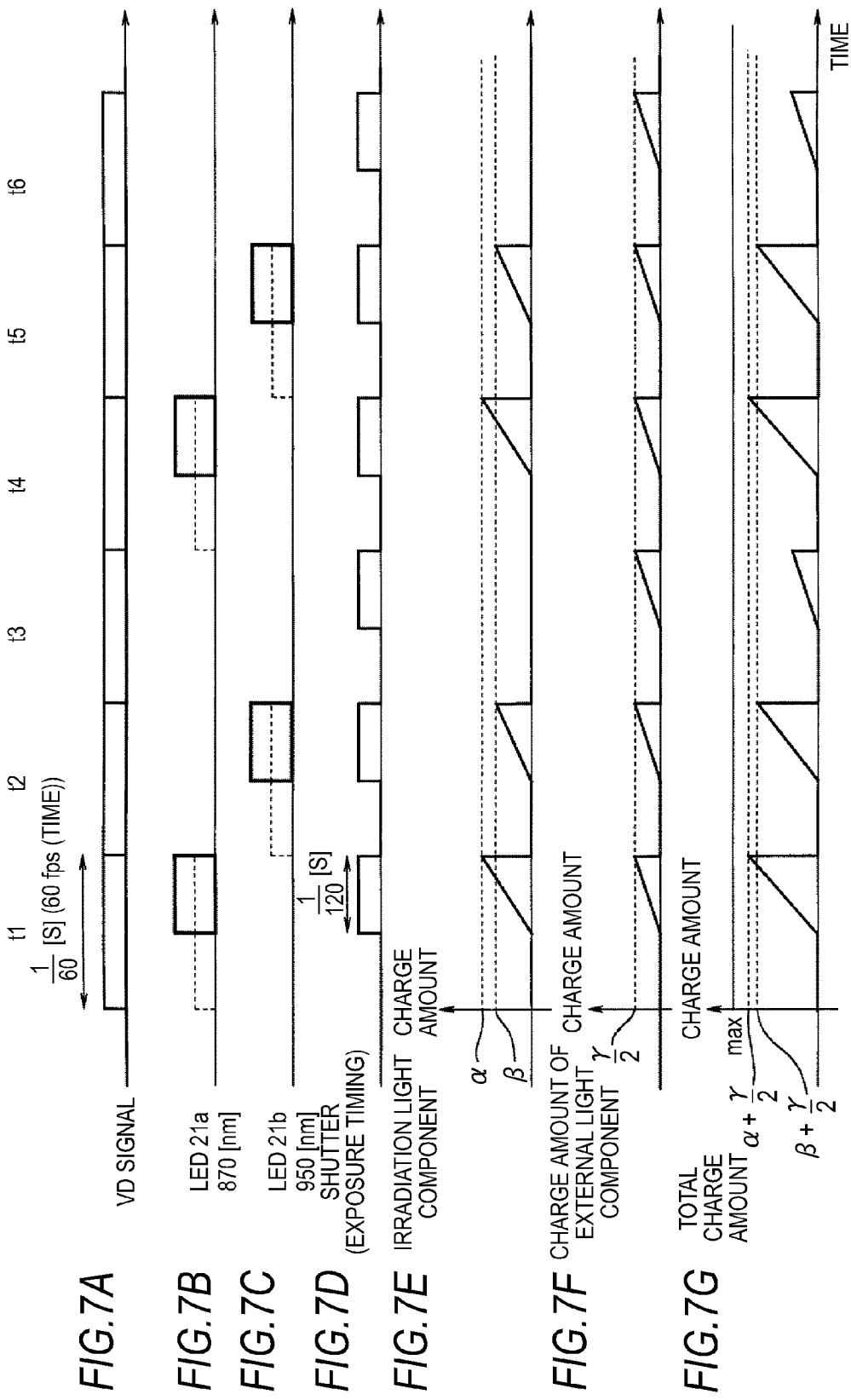
FIGS. 7A to 7G are diagrams illustrating an example of a control performed by a control section.
Figure 8:
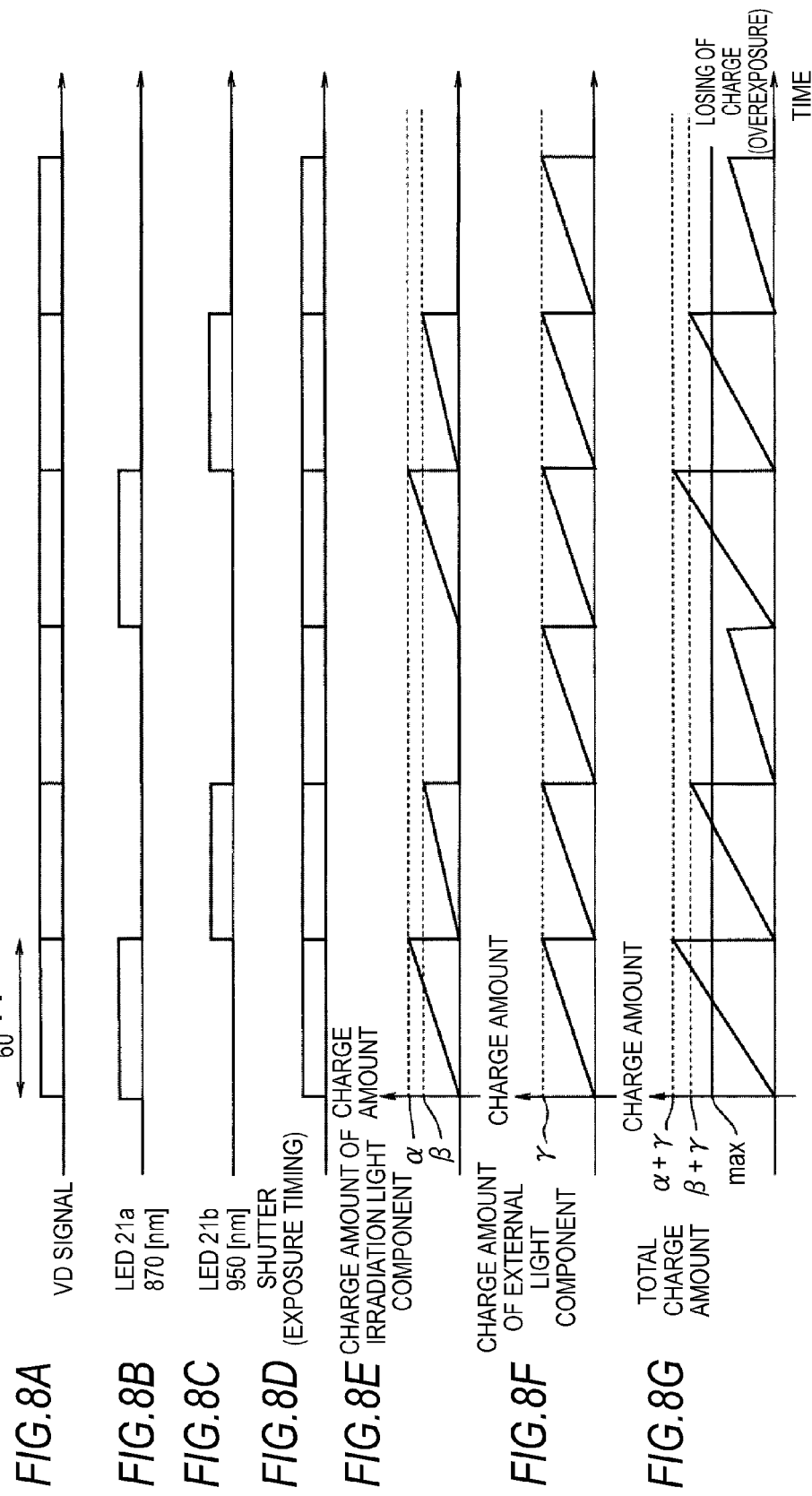
FIGS. 8A to 8G are diagrams illustrating an example in which skin detecting precision is degraded due to an external light component.
Figure 9:
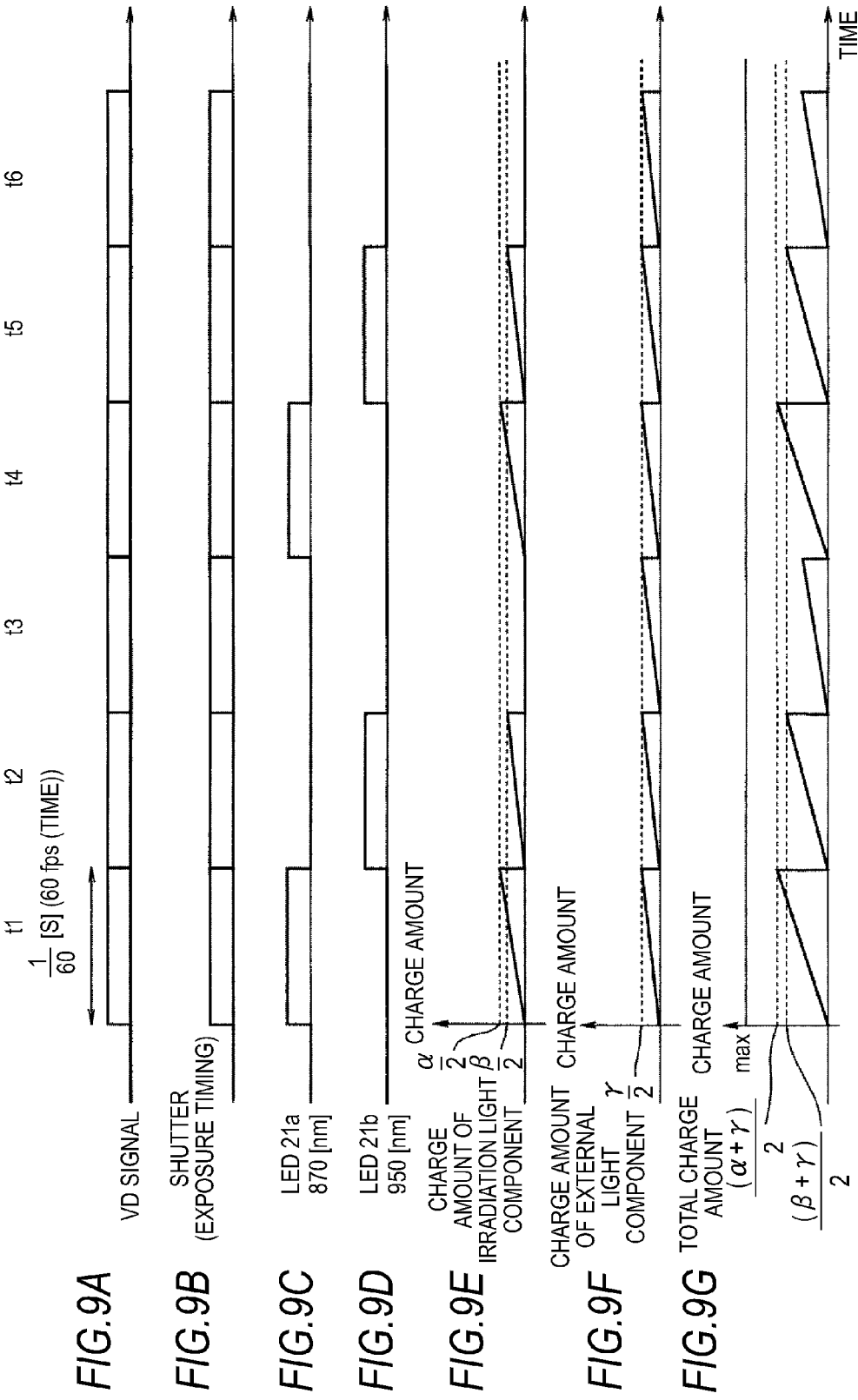
FIGS. 9A to 9G are diagrams illustrating an example when charges accumulated by an external light component are suppressed by adjusting an aperture of a camera.
Figure 10:
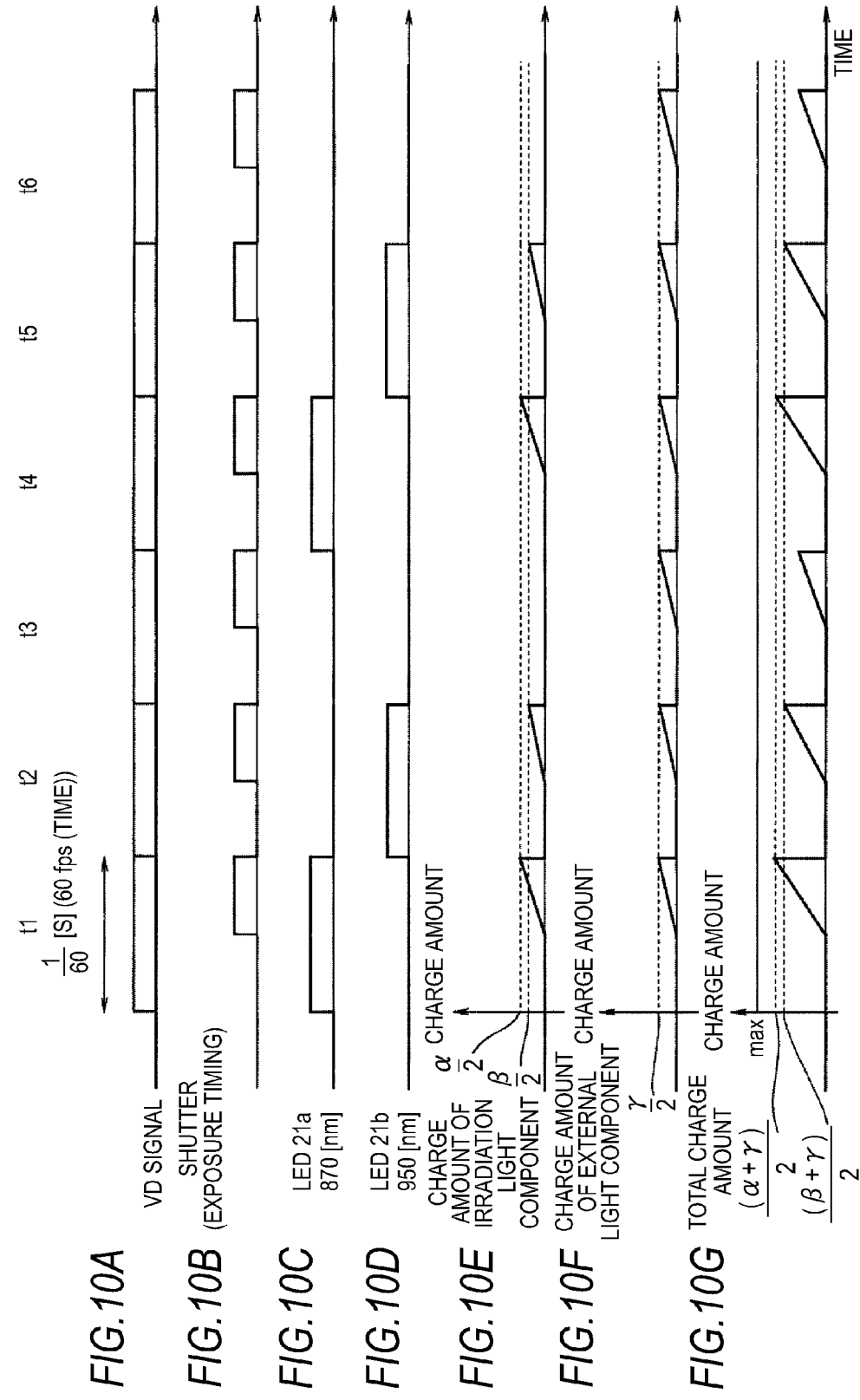
FIGS. 10A to 10G are diagrams illustrating an example in which charges accumulated by an external light component are suppressed by adjusting only a shutter speed of a camera.

That is, for example, as shown in FIG. 7B, the control section 111 starts to emit light from the LED 21*a* at the timing delayed by 8.35 ms (=1/120 s) from the timings t1 and t4 at which rising edges are generated in the plurality of rising edges generated in the VD signals, and ends the emission of the light after 8.35 ms is elapsed from the start of the emission of the light.

Furthermore, in FIG. 7B, the LED 21*a* is controlled by the control section 111 so that light of the accumulated light amount equal to or more than the accumulated light amount necessary for detecting the skin at a predetermined distance from the light emitting device 61 is irradiated within the irradiation time regardless of the irradiation time.

That is, for example, the LED 21*a* is controlled by the control section 111 so that the accumulated light amount (the rectangle depicted by the solid line of FIG. 7B) of the light emitted only for 8.35 ms does not becomes smaller than the accumulated light amount (the rectangle depicted by the dotted line of FIG. 7B) of the light emitted only for 16.7 ms (=1/60 s), but is almost the same within a possible range.

Accordingly, for example, even when the irradiation time of the LED 21*a* is set to be short, the accumulated light amount equal to or more than the accumulated light amount necessary for detecting the skin at a predetermined distance from the light emitting device 61 may be output. The same applies to FIG. 7C.

Furthermore, the method of controlling the accumulated light amounts of the LED 21*a* and the LED 21*b* will be described below by referring to FIGS. 11 and 12.

Further, for example, as shown in FIG. 7C, the control section 111 starts to emit light from the LED 21*b* at a timing delayed by 8.35 ms from the timings t2, t5, . . . generating rising edges in the plurality of rising edges generated in the VD signal, and ends the emission of the light after 8.35 ms is elapsed from the start of the emission of the light.

Furthermore, for example, as shown in FIG. 7D, the control section 111 starts the exposure of the camera 62 at a timing delayed by 8.35 ms from the timings t1, t2, t3, t4, t5, t6, . . . generating the plurality of rising edges generated in the VD signal, and ends the exposure after 8.35 ms is elapsed from the start of the exposure.

Furthermore, as shown in FIGS. 7B and 7C, the LED 21*a* and the LED 21*b* output the light of the accumulated light amount equal to or more than the accumulated light amount necessary for detecting the skin at a predetermined distance from the light emitting device 61 regardless of the irradiation time. Therefore, as shown in FIG. 7E, the charge amounts of charges accumulated by the irradiation light components of the wavelengths λ1 and λ2 at pixels corresponding to the skin region in the camera 62 are maintained to be the charge amounts α and β necessary for detecting the skin regardless of each irradiation time of the LED 21a and the LED 21b.

Further, as shown in FIG. 7F, in order to perform the exposure at the exposure time of 8.35 ms in the camera 62, the charge amount of charges accumulated by the external light component is suppressed to be a charge amount γ/2. Furthermore, the charge amount γ indicates the charge amount accumulated by the external light component when the exposure time is set to 16.7 ms.

For this reason, as shown in FIG. 7G, the total charge amount obtained when light is emitted from the LED 21a becomes a charge amount α+(γ/2) less than the maximal charge amount max that can be accumulated. The camera 62 creates the λ1 image constituted by the pixel value $(I_{\lambda 1}+I_{\textit{off}})$ corresponding to the charge amount α+(γ/2), and supplies the image to the ratio image creating section 102.

Further, the total charge amount obtained when light is emitted from the LED 21b becomes a charge amount β+(γ/2) less than the maximal charge amount max. The camera 62 creates the λ2 image constituted by the pixel value $(I_{\lambda 2}+T_{\textit{off}})$ corresponding to the charge amount β+(γ/2), and supplies the image to the ratio image creating section 102.

Furthermore, the total charge amount obtained when the LED 21a and the LED 21b are all turned off becomes the charge amount γ/2 accumulated by the external light component. The camera 62 creates the external light image constituted by the pixel value $I_{\textit{off}}$ corresponding to the charge amount γ/2, and supplies the image to the ratio image creating section 102.

In the second embodiment, as shown in FIGS. 7A to 7G, since the charge amount γ of the charges accumulated by the external light component in the camera 62 is suppressed to be the charge amount γ/2, the overexposure shown in FIGS. 8A to 8G (particularly, FIG. 8G) may be prevented.

Furthermore, as a method of preventing the overexposure, for example, as shown in FIGS. 9A to 9G, a method may be supposed in which the aperture of the camera 62 or the sensitivity thereof is adjusted to suppress the charge amount γ obtained by the external light component to be, for example, γ/2. Further, for example, as shown in FIGS. 10A to 10G, a method may be supposed in which only the shutter speed of the camera 62 is adjusted so that the exposure time becomes, for example, ½ to suppress the charge amount obtained by the external light component to be γ/2.

According to the method of adjusting the aperture or the sensitivity of the camera 62 as shown in FIGS. 9A to 9G and the method of only adjusting the shutter speed of the camera 62 as shown in FIGS. 10A to 10G, the charge amount γ causing the overexposure (causing a deterioration in skin detecting precision of detecting the skin region) may be sufficiently suppressed.

However, in such a case, the charge amounts α and β necessary for detecting the skin region are largely suppressed.

Therefore, in the second embodiment, as described above by referring to FIGS. 7A to 7G, the skin detecting precision of detecting the skin region on the image improves by sufficiently suppressing the charge amount (γ mentioned in FIGS. 7A to 7G) accumulated by the external light component while the charge amounts (α and β mentioned in FIGS. 7A to 7G) accumulated by the irradiation light components of the wavelength λ1 and λ2 are maintained.

Next, referring to FIGS. 11 and 12, a case will be described in which the control section 111 irradiates light of the accumulated light amount equal to or more than the accumulated light amount necessary for detecting the skin regardless of the irradiation time by controlling the forward current flowing to the LED 21a in accordance with the irradiation time of the LED 21a. Furthermore, since the LED 21b is controlled in the same manner as the LED 21b, and the light of the accumulated light amount equal to or more than the accumulated light amount necessary for detecting the skin is irradiated, in FIGS. 11 and 12, only a case will be described in which the control section 111 controls the LED 21a.

Control of Accumulated Light Amount

Figure 11:
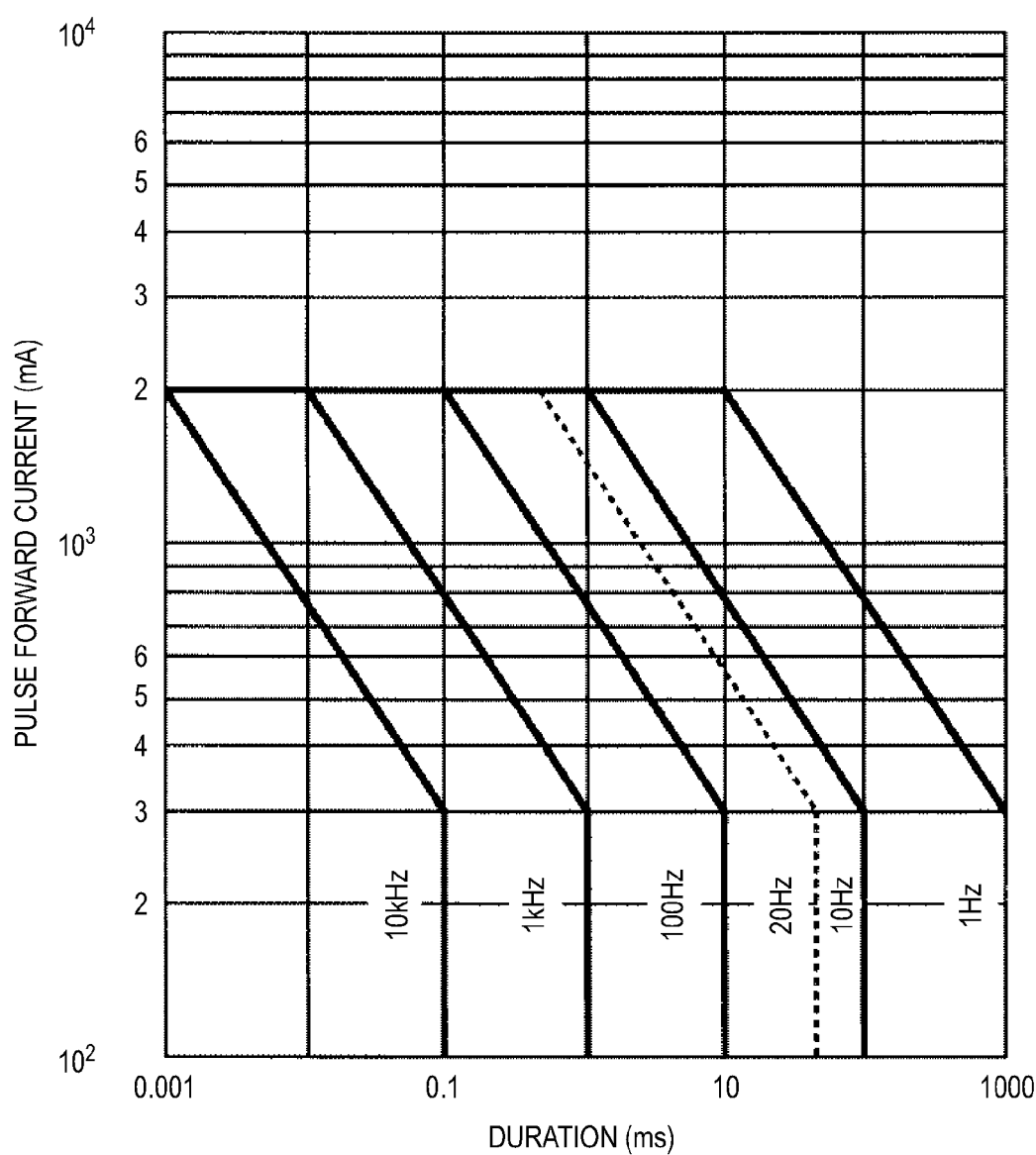
FIG. 11 is a diagram illustrating an example of a relation between a light emitting pulse width and an allowable forward current.

Next, FIG. 11 illustrates a relation between the light emitting pulse width of the LED and the allowable forward current.

In FIG. 11, the horizontal axis indicates the light emitting pulse width (ms) representing the continuous light emitting duration, and the vertical axis indicates the allowable forward current (mA). Furthermore, FIG. 11 illustrates a relation between the light emitting pulse width and the allowable forward current of the LED 21a emitting light of 10 kHz, the LED 21a emitting light of 1 kHz, the LED 21a emitting light of 100 Hz, the LED 21a emitting light of 20 Hz, the LED 21a emitting light of 10 Hz, and the LED 21a emitting light of 1 Hz in an order from the left. Here, Hz indicates the number in which the LED 21a emits light for 1 second.

Figure 12:
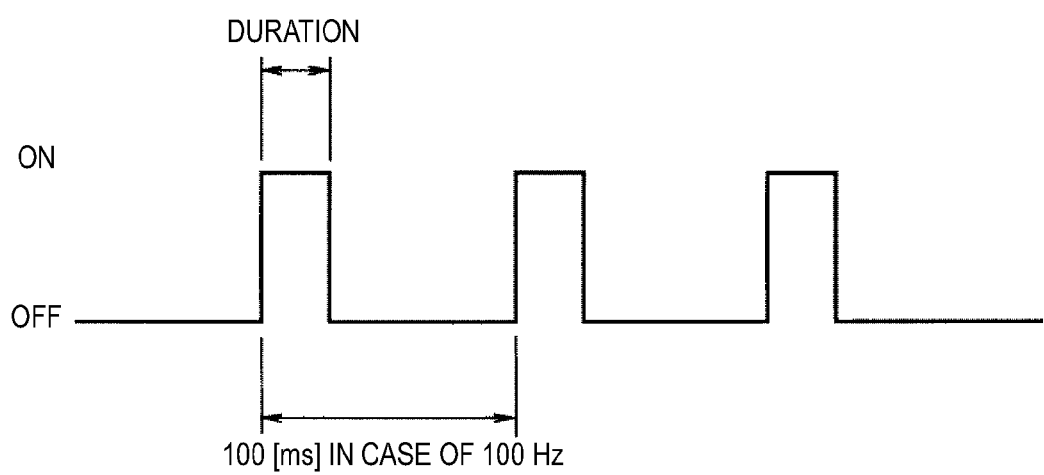
FIG. 12 is a diagram illustrating an example of a light emitting pulse width.

As shown in FIG. 12, when the LED 21a is controlled so that the LED emits light for the duration of a light emitting pulse width w1 and is turned off in other durations, the control section 111 may increase the forward current flowing to the LED 21a by the increase of the rated current of the forward current compared to the case where the LED emits light for a duration of a light emitting pulse width w2 longer than the light emitting pulse width w1. Furthermore, the rated current is determined in advance by the manufacturer of the LED 21a, and indicates the allowable limitation value of the forward current guaranteeing that the LED 21a normally emits light even when the forward current flows to the LED 21a for a duration of the light emitting pulse width.

Therefore, since the control section 111 may allow the larger forward current to flow to the LED 21a as the irradiation time becomes shorter, the accumulated light amount of the light irradiated by the LED 21a for a short irradiation time may be set to a large value.

Specifically, for example, in the case where the LED 21a emits light of 10 Hz, the allowable rated current of the forward current becomes 300 mA when the light emitting pulse width is set to 100 ms, and the allowable rated current of the forward current becomes 800 mA when the light emitting pulse width is set to 10 ms.

Therefore, for example, the control section 111 allows the allowable rated current of 300 mA of the forward current to flow to the LED 21a when the light emitting pulse width is set to 100 ms, and allows the allowable rated current of 800 mA of the forward current to flow to the LED 21a when the light emitting pulse width is set to 10 ms. Likewise, for example, since the rated current is made to flow to the LED 21a on the basis of, for example, the principle that the rated current corresponding to the irradiation time becomes larger as the irradiation time becomes shorter, even when the irradiation time becomes shorter, the accumulated light amount does not become smaller as much as the shortened irradiation time. Accordingly, it is possible to obtain the accumulated light amount equal to or more than the accumulated light amount necessary for detecting the skin at a predetermined distance from the light emitting device 61.

Therefore, the LED 21a may emit light with substantially the same power consumption and substantially the same accumulated light amount regardless of the irradiation time under the control of the control section 111. For this reason, even in an environment where the external light component is large, the skin region may be detected without increasing the power consumption or shortening the distance of capable of detecting the skin region.

Example of Method of Determining Exposure Time

Next, referring to FIGS. 13A and 13B, an example of a method of determining an exposure time on the basis of the external light image from the camera 62 performed by the control section 111 will be described.

Figure 13A:
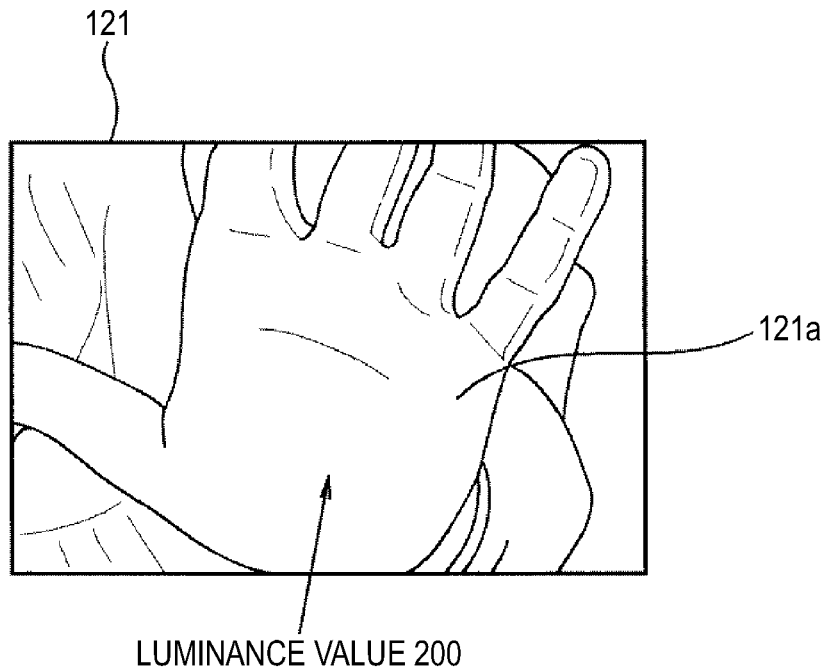
FIGS. 13A and 13B are diagrams illustrating an example of a method of determining an exposure time.

FIG. 13A illustrates an external light image 121 obtained by receiving only the external light component at the exposure time of 16.7 ms. Furthermore, an external light image 121 shown in FIG. 13A includes only the skin region 121a, and the maximal value of the pixel value (for example, the luminance value) of the pixel constituting the skin region 121a is set to a pixel value 200. Furthermore, in the external light image 121 shown in FIG. 13A, a portion other than the skin region 121a is also described in addition to the skin region 121a for convenience of the drawings. The same applies to FIG. 13B.

Figure 13B:
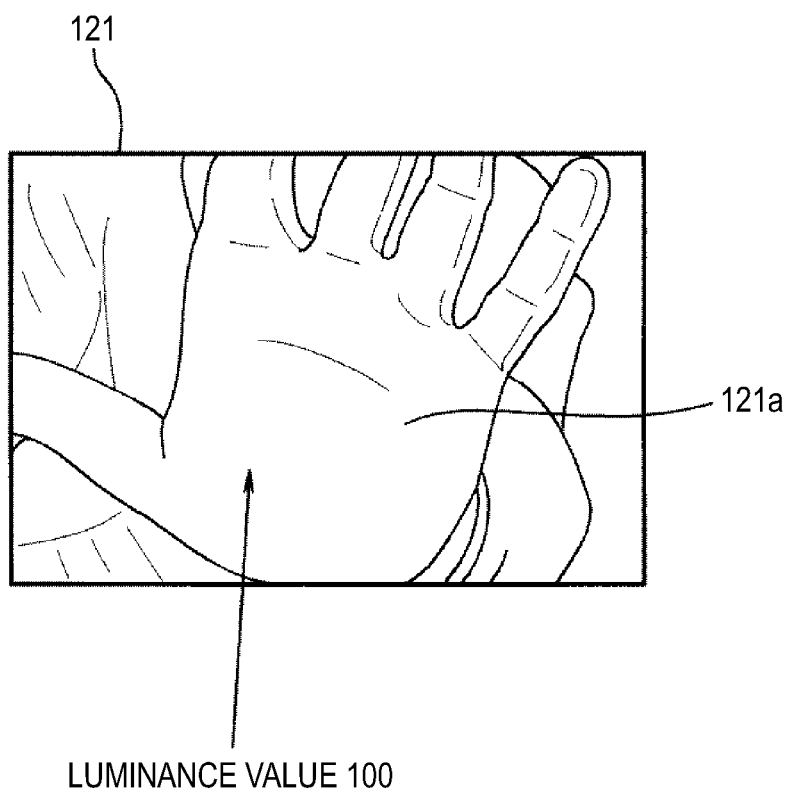

FIG. 13B illustrates an external light image 121 obtained by receiving only the external light image at the exposure time of 8.35 ms. The external light image 121 shown in FIG. 13B includes only the skin region 121a, and the maximal value of the pixel value of the pixel constituting the skin region 121a is set to a pixel value 100.

Furthermore, in the second embodiment, the grayscale of the pixel value is set to N bits, and the maximal pixel value is set to $2^N-1$.

In this case, in order to prevent the overexposure, it is necessary to satisfy the following equation (1) by the charge amount of charges accumulated in the skin region.

$$\gamma < \max - \alpha \quad (1)$$

Furthermore, the charge amount $\alpha$ indicates the charge amount accumulated by the irradiation light component of the wavelength $\lambda 1$, and the charge amount $\gamma$ indicates the charge amount accumulated by the external light component. Further, the maximal charge amount max indicates the maximal amount capable of accumulating charges.

When the equation (1) is changed to an equation with respect to the pixel value, the following equation (1') is obtained.

$$I_{off} < (2^N-1) - I_{\lambda 1} \quad (1')$$

Furthermore, the maximal pixel value ($2^N-1$) indicates a pixel value corresponding to the maximal charge amount max.

Incidentally, the minimal pixel value of the pixel value $I_{\lambda 1}$ necessary for detecting the skin region is determined from camera noise of the camera 62 to be used, and is indicated by Lum_min. Here, when the longest use distance defined in the specification is indicated by d1 and the shortest use distance is indicated by d2, the maximal value x of the pixel value $I_{\lambda 1}$ becomes $x=(d1/d2)^2 \times Lum\_min$.

When the overexposure of the pixel in the skin region is considered, since it is given that the pixel value of the $\lambda 2$ image is smaller than the pixel value of the $\lambda 1$ image, only the $\lambda 1$ image may be considered. The maximal value of the pixel value $I_{\lambda 1}$ in the equation (1') becomes the pixel value x.

For this reason, in order to prevent the overexposure caused by the pixel value $I_{off}$ in the $\lambda 1$ image (including the pixel value $I_{\lambda 1}+I_{off}$), it is necessary to satisfy the following equation (2).

$$I_{off} < (2^N-1) - x \quad (2)$$

Therefore, the control section 111 determines the exposure time satisfying the equation (2) on the basis of the external light image from the camera 62.

That is, for example, the control section 111 allows the camera 62 to receive the external light component for 16.7 ms of the exposure time while the LED 21a and the LED 21b are turned off, and acquires the external light image 121 shown in FIG. 13A.

Then, the control section 111 detects the maximal pixel value $I_{off}$ in the pixel values of the pixels constituting the skin region on the acquired external light image 121, and determines the exposure time so that the detected maximal pixel value $I_{off}$ satisfies the equation (2).

Specifically, for example, when N=8 and x=100, it is necessary to set the maximal pixel value $I_{off}$ to be less than 155 (=255−100). In this case, when the maximal pixel value $I_{off}$ is 200 in the pixel values of the pixels constituting the skin region 121a on the external light image 121 captured for 16.7 ms of the exposure time as shown in FIG. 13A, the control section 111 sets the exposure time to 8.35 ms at which the pixel value $I_{off}$=200 is less than 155, for example, 100 as shown in FIG. 13B.

As described above, the distance range capable of detecting the skin may be widened without increasing power consumption by driving the LED 21a and LED 21b using a rated current for an exposure time matching the irradiation time of the LED 21a and the LED 21b while reducing the influence of the exposure light by setting the exposure time to be shorter than the vertical synchronization duration. It is desirable that the exposure time be 80% or less of the vertical synchronization duration. Further, it is desirable that the current flowing to the LED 21a and the LED 21b be set to be larger than the rated current when light is emitted in accordance with the vertical synchronization duration.

Furthermore, the process of determining the exposure time described by referring to FIGS. 13A and 13B is performed, for example, before the shipment of the product or the skin detecting process as the specification of the information processing device 61. Further, the control section 111 determines the irradiation time of the LED 21a and the LED 21b to be equal to the determined exposure time, and determines the forward current flowing to the LED 21a and the LED 21b for the irradiation time. Then, the control section 111 allows the camera 62 to capture the image of the subject for the determined exposure time at the timing shown in FIGS. 7A to 7G, and emits light from the LED 21a and the LED 21b for the irradiation time equal to the determined exposure time. Accordingly, the skin detecting process shown in FIG. 5 is performed.

In this case, since the charge amount of charges accumulated by the irradiation light components of the wavelengths $\lambda 1$ and $\lambda 2$ is maintained, and the charge amount of charges accumulated by the external light component is sufficiently suppressed, the skin detecting precision of detecting the skin on the image may improve compared to, for example, the existing skin recognizing system 1.

Furthermore, in the description performed by referring to FIG. 6 or FIGS. 13A and 13B, the exposure time or the like of the camera 62 in the skin detecting process is determined in advance. However, it is necessary to change the predetermined exposure time in accordance with the change of the distance z or the light amount of the external light source as the skin detecting process is repeated.

Therefore, in the skin detecting process, it is desirable that the exposure time dynamically change when the distance z or the light amount of the external light source changes.

Description of Operation of Dynamic Changing Process

Next, referring to the flowchart of FIG. 14, a dynamic changing process will be described which dynamically changes the exposure time when the distance z or the light amount from the external light source changes in the skin detecting process.

Furthermore, in the dynamic changing process, the exposure time and the like of the camera 62 are determined in advance in the manner described in, for example, FIGS. 13A and 13B when starting, for example, the dynamic changing process. Then, the exposure time is dynamically changed to correspond to the dynamic change of the light amount of the external light source.

Figure 5:
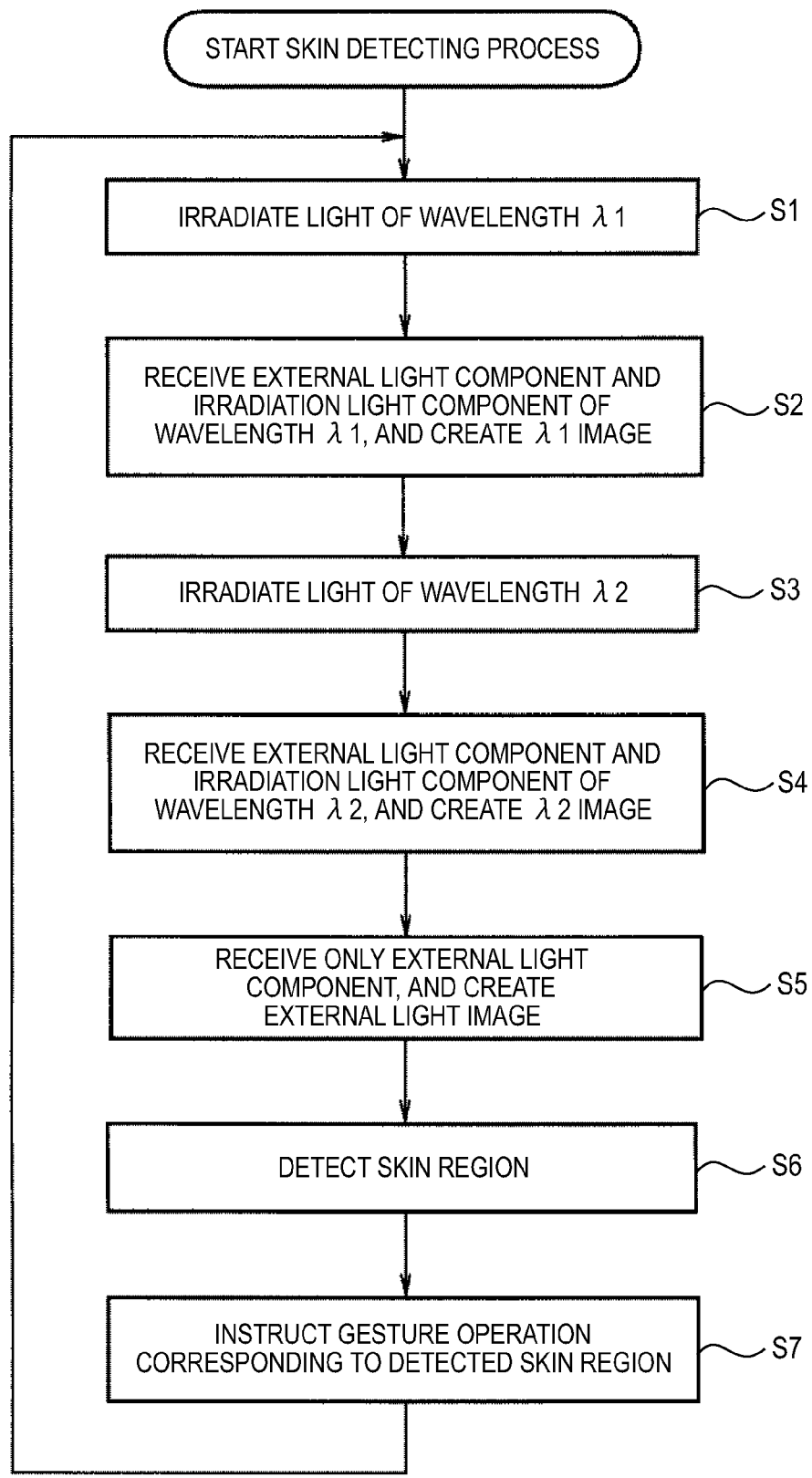
FIG. 5 is a flowchart illustrating an example of a skin detecting process performed by the information processing system.

That is, in step S21 to step S26, the same process as that of step S1 to step S6 of FIG. 5 is performed.

In step S27, the control section 111 determines whether the maximal pixel value $I_{off}$ in the pixel values of the pixels constituting the skin region on the external light image from the camera 62 satisfies the equation (2) or not, that is, the maximal pixel value is less than a predetermined threshold value (for example, 155) or not. Furthermore, the skin region on the external light image is specified on the basis of the skin region detected in the process of preceding step S26.

Then, in step S27, the control section 111 performs the process of step S29 when it is determined that the maximal pixel value $I_{off}$ of the pixel values of the pixels constituting the skin region on the external light image from the camera 62 is not less than a predetermined threshold value.

In step S29, the control section 111 determines (changes) the exposure time of the camera 62 to the shorter exposure time. Further, the control section 111 adjusts the irradiation time and the accumulated light amount of the LED 21a and the LED 21b in accordance with the determined exposure time. Then, the control section 111 returns the process to step S1, and performs the same process therefrom.

Further, in step S27, the control section 111 performs the process of step S28 when it is determined that the maximal pixel value $I_{off}$ of the pixel values of the pixels constituting the external light image from the camera 62 is less than a predetermined threshold value.

In step S28, the control section 111 returns the process to step S1 by outputting an instruction that performs a gesture operation in accordance with the detection result from the binarization section 103 to the rear stage, and performs the same process therefrom.

Furthermore, the dynamic changing process is ended, for example, when the information processing system 41 is turned off by the user.

As described above, in the dynamic changing process, the exposure time and the like of the camera 62 are appropriately changed (corrected) on the basis of the external light image obtained by receiving only the external light component so that the skin region is detected with high precision.

Accordingly, in the dynamic changing process, since the exposure time dynamically changes in accordance with the change of the distance z or the light amount from the external light source in the skin detecting process, the skin region may be detected with high precision even when the distance z or the light amount of the external light source changes.

Furthermore, in the second embodiment, even when the exposure time changes in accordance with the external light image, the LED 21a and the LED 21b are made to be operated with substantially the same power consumption so that the accumulated light amount becomes substantially the same regardless of whether the irradiation time is long or short for the irradiation time equal to the exposure time even when the exposure time changes in accordance with the external light image.

Further, in the second embodiment, the external light components are suppressed while maintaining the irradiation light components of the wavelengths λ1 and λ2.

For this reason, for example, even in an environment where the external light component is large, the skin region may be detected with high precision without increasing power consumption or shortening the distance capable of detecting the skin region.

3. Modified Example

In the first embodiment, the skin region is detected on the basis of the magnitude of the ratio $I_{\lambda 1}/I_{\lambda 2}$. In addition, for example, the difference $(I_{\lambda 1} - I_{\lambda 2})$ may be normalized (divided) by the pixel value $I_{\lambda 1}$ of which the influence of the external light component is removed and which is obtained by subtracting the pixel value $I_{off}$ of the external light image from the pixel value $(I_{\lambda 1} + I_{off})$ of the λ1 image, and the skin region may be detected on the basis of the magnitude of the ratio $(I_{\lambda 1} - I_{\lambda 2})/I_{\lambda 1}$ obtained as a result thereof. In this case, the threshold value as the fixed value may be used as in the case of using the ratio $I_{\lambda 1}/I_{\lambda 2}$.

Furthermore, the value used for the normalization is not limited to the pixel value $I_{\lambda 1}$, but may be any value based on at least one of the pixel values $I_{\lambda 1}$ and $I_{\lambda 2}$. For example, the value may be normalized by the pixel value $I_{\lambda 2}$ or the pixel value $(I_{\lambda 1} + I_{\lambda 2/2})$. The normalization is substantially the same process using the ratio $I_{\lambda 1}/I_{\lambda 2}$.

In the second embodiment, the light emitting timing of the LED 21a and the LED 21b is made to be equal to the exposure timing of the camera 62, but the light emitting timing is not limited thereto.

That is, the light emitting timing may be any timing when the accumulated light amount of the light irradiated from the LED 21a and the LED 21b within the exposure time becomes a predetermined amount or more of light amount necessary for detecting the skin.

Specifically, for example, the LED 21a and the LED 21b may emit light within the irradiation time shorter than the exposure time within the exposure time by deviating the light emitting timing of the LED 21a and the LED 21b from the exposure timing of the camera 62, and light may be emitted for the irradiation time longer than the exposure time including a part of or all the exposure time.

Further, in the first and second embodiments, the information processing system 41 detecting the skin region has been described, but the information processing system 41 may be built in an electronic apparatus such as a television.

In this case, for example, in the television provided with the information processing system 41, the channel is changed in accordance with the detection result of the skin region detected by the information processing system 41.

Incidentally, the above-described series of processes may be performed by dedicated hardware or software. When the series of processes are performed by software, the program constituting the software is installed as a storage medium on a so-called assembled computer or a general personal computer capable of performing various functions by installing various programs thereon.

Configuration Example of Computer

Figure 15:
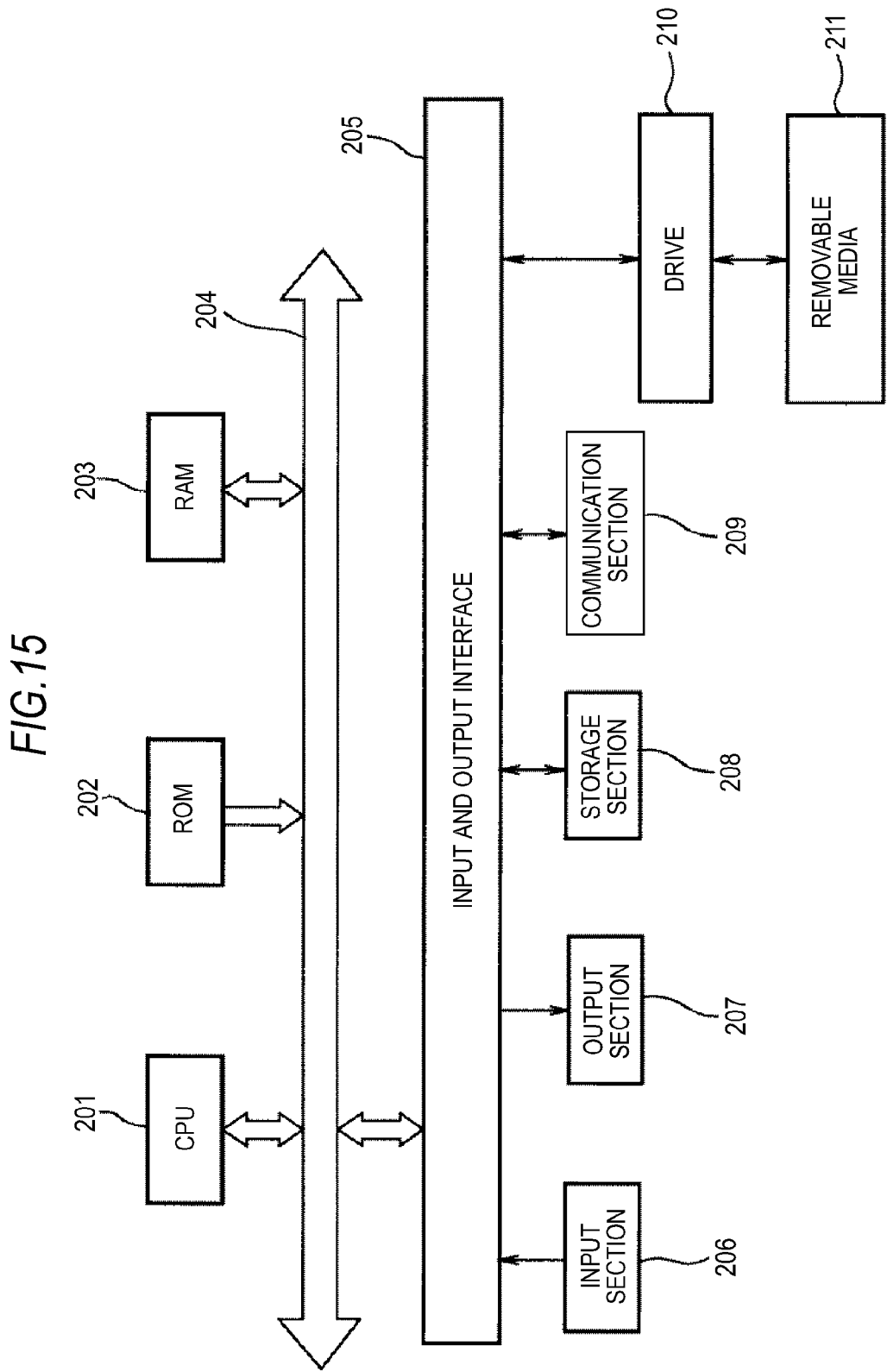
FIG. 15 is a block diagram illustrating a configuration example of a computer.

Next, FIG. 15 illustrates a configuration example of a personal computer performing the above-described series of processes by the program.

A CPU (central processing unit) 201 performs various processes in accordance with a program stored on a ROM (read only memory) 202 or a storage section 208. The program or data performed by the CPU 201 is appropriately stored on a RAM (random access memory) 203. The CPU 201, the ROM 202, and the RAM 203 are connected to each other via a bus 204.

The CPU 201 is further connected to an input and output interface 205 via the bus 204. The input and output interface 205 is connected to an input section 206 such as a keyboard, a mouse, and a microphone and an output section 207 such as a display and a speaker. The CPU 201 performs various processes in response to the instruction input from the input section 206. Then, the CPU 201 outputs the process result to the output section 207.

The storage section 208 connected to the input and output interface 205 is configured as, for example, a hard disk, and stores various programs and data performed by the CPU 201. The communication section 209 communicates with an external device via a network such as the Internet or a local area network.

Further, a program may be acquired through the communication section 209, and may be stored in the storage section 208.

A drive 210 connected to the input and output interface 205 drives a removable media 211 such as a magnetic disk, an optical disc, an optical magnetic disc, or a semiconductor memory attached to the computer, and acquires the program or the data stored thereon. The acquired program or data is transmitted to the storage section 208 to be stored thereon if necessary.

As shown in FIG. 15, the storage medium recording (storing) the program installed on the computer and performed by the computer includes the removable media 211 as a package media including a magnetic disk (including a flexible disk), an optical disc (including a CD-ROM (compact disc-read only memory) and a DVD (digital versatile disc)), an optical magnetic disc (including a MD (mini-disc)) or a semiconductor memory, the ROM 202 temporarily or permanently storing the program, or the hard disk constituting the storage section 208. The program may be stored on the storage medium via the communication section 209 as an interface such as a router and a modem if necessary by using a wired or wireless communication medium such as a local area network, the Internet, and a digital satellite broadcast.

Furthermore, in the specification, the step of describing the above-described series of processes may be performed in a description order according to time series or may be performed in parallel or individually.

Further, in the specification, the system indicates an overall apparatus including a plurality of devices.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A detecting device detecting a skin region representing a skin portion of a subject, the detecting device comprising:
    a first irradiation section that allows the subject to be irradiated with light of a first wavelength;
    a second irradiation section that allows the subject to be irradiated with light of a second wavelength as a long wavelength in relation to the first wavelength;
    a captured image creating section that creates a first image on the basis of light reflected from the subject when the subject is irradiated with the light of the first wavelength, creates a second image on the basis of light reflected from the subject when the subject is irradiated with the light of the second wavelength, and creates an external light image on the basis of light reflected from the subject when the subject is not irradiated with any light of the first and second wavelengths; and
    a detecting section that detects the skin region on the basis of
        a first value representing a ratio between a difference between a pixel value of the first image and a pixel value of the external light image and a difference between a pixel value of the second image and the pixel value of the external light image or
        a second value obtained by normalizing the difference between the pixel value of the first image and the pixel value of the second image to at least one of a difference obtained by subtracting the pixel value of the external light image from the pixel value of the first image and the difference obtained by subtracting the pixel value of the external light image from the pixel value of the second image.

2. The detecting device according to claim 1,
    wherein the captured image creating section receives light reflected from the subject for an exposure time determined in advance so that the maximal value of the pixel value of the skin region on the external light image becomes less than a predetermined value.

3. The detecting device according to claim 2,
    wherein the captured image creating section receives light reflected from the subject for the exposure time determined in advance so that the maximal value of the pixel value of the skin region on the external light image becomes less than the predetermined value obtained by subtracting a predetermined value based on the amount of the light of the first and second wavelengths from the maximal value obtained as the pixel value.

4. The detecting device according to claim 2, further comprising:
    a determining section that determines whether the maximal value of the pixel value of the skin region detected by the detecting section as a region on the external light image created by the captured image creating section is less than the predetermined value; and
    a setting section that sets the exposure time of the captured image creating section to the shorter exposure time when it is determined that the maximal pixel value is not less than the predetermined value.

5. The detecting device according to claim 2,
    wherein the first irradiation section irradiates the light of the first wavelength with an accumulated light amount equal to or more than a minimal accumulated light amount determined in advance as an accumulated light amount minimally necessary for detecting the skin region, and
    wherein the second irradiation section irradiates the light of the second wavelength with a light amount equal to or more than the minimal accumulated light amount.

6. The detecting device according to claim 5, further comprising:
    an irradiation control section that operates the first and second irradiation sections in a manner such that a rated current corresponding to the irradiation time is made to flow to the first and second irradiation sections.

7. The detecting device according to claim 1, further comprising:
a restricting section that restricts visible light from being input to the captured image creating section,
wherein the first irradiation section irradiates the light of the first wavelength as a wavelength of a near infrared light region,
wherein the second irradiation section irradiates the light of the second wavelength as a wavelength of a near infrared light region, and
wherein the captured image creating section receives light reflected from the subject through the restricting section.

8. The detecting device according to claim 2,
wherein the first irradiation section irradiates the light of the first wavelength for the same irradiation time as the exposure time, and
wherein the second irradiation section irradiates the light of the second wavelength for the same irradiation time as the exposure time.

9. A detecting method of a detecting device detecting a skin region representing a skin portion of a subject and including a first irradiation section that allows the subject to be irradiated with light of a first wavelength; a second irradiation section that allows the subject to be irradiated with light of a second wavelength as a long wavelength in relation to the first wavelength; and a captured image creating section that creates a first image on the basis of light reflected from the subject when the subject is irradiated with the light of the first wavelength, creates a second image on the basis of light reflected from the subject when the subject is irradiated with the light of the second wavelength, and creates an external light image on the basis of light reflected from the subject when the subject is not irradiated with any light of the first and second wavelengths, the detecting method comprising:
detecting the skin region on the basis of a first value representing a ratio between a difference between a pixel value of the first image and a pixel value of the external light image and a difference between a pixel value of the second image and the pixel value of the external light image or a second value obtained by normalizing the difference between the pixel value of the first image and the pixel value of the second image to at least one of a difference obtained by subtracting the pixel value of the external light image from the pixel value of the first image and the difference obtained by subtracting the pixel value of the external light image from the pixel value of the second image.

10. A non-transitory computer readable medium storing a program for a computer controlling a detecting device detecting a skin region representing a skin portion of a subject and including:
a first irradiation section that allows the subject to be irradiated with light of a first wavelength;
a second irradiation section that allows the subject to be irradiated with light of a second wavelength as a long wavelength in relation to the first wavelength; and
a captured image creating section that creates a first image on the basis of light reflected from the subject when the subject is irradiated with the light of the first wavelength, creates a second image on the basis of light reflected from the subject when the subject is irradiated with the light of the second wavelength, and creates an external light image on the basis of light reflected from the subject when the subject is not irradiated with any light of the first and second wavelengths,
the program causing the computer to serve as a detecting section that detects the skin region on the basis of
a first value representing a ratio between a difference between a pixel value of the first image and a pixel value of the external light image and a difference between a pixel value of the second image and the pixel value of the external light image or
a second value obtained by normalizing the difference between the pixel value of the first image and the pixel value of the second image to at least one of a difference obtained by subtracting the pixel value of the external light image from the pixel value of the first image and the difference obtained by subtracting the pixel value of the external light image from the pixel value of the second image.

11. An electronic apparatus comprising:
a detecting device detecting a skin region representing a skin portion of a subject, the detecting device including:
a first irradiation section that allows the subject to be irradiated with light of a first wavelength;
a second irradiation section that allows the subject to be irradiated with light of a second wavelength as a long wavelength in relation to the first wavelength;
a captured image creating section that creates a first image on the basis of light reflected from the subject when the subject is irradiated with the light of the first wavelength, creates a second image on the basis of light reflected from the subject when the subject is irradiated with the light of the second wavelength, and creates an external light image on the basis of light reflected from the subject when the subject is not irradiated with any light of the first and second wavelengths; and
a detecting section that detects the skin region on the basis of
a first value representing a ratio between a difference between a pixel value of the first image and a pixel value of the external light image and a difference between a pixel value of the second image and the pixel value of the external light image or
a second value obtained by normalizing the difference between the pixel value of the first image and the pixel value of the second image to at least one of a difference obtained by subtracting the pixel value of the external light image from the pixel value of the first image and the difference obtained by subtracting the pixel value of the external light image from the pixel value of the second image.

* * * * *